US012614843B2

(12) United States Patent
Wang et al.

(10) Patent No.: US 12,614,843 B2
(45) Date of Patent: Apr. 28, 2026

(54) ANTENNA DEVICE

(71) Applicant: AUO Corporation, Hsinchu City (TW)

(72) Inventors: Yu-Chih Wang, Hsinchu City (TW); Chung-Hung Chen, Hsinchu City (TW); Yi-Cheng Lai, Hsinchu City (TW); Shih-Hsien Yang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 59 days.

(21) Appl. No.: 18/935,663

(22) Filed: Nov. 4, 2024

(65) Prior Publication Data

US 2025/0192428 A1 Jun. 12, 2025

Related U.S. Application Data

(60) Provisional application No. 63/606,806, filed on Dec. 6, 2023.

(30) Foreign Application Priority Data

Jul. 19, 2024 (TW) ................................ 113127157

(51) Int. Cl.

| | |
|---|---|
| ***H01Q 1/36*** | (2006.01) |
| ***H01Q 1/22*** | (2006.01) |
| ***H01Q 1/48*** | (2006.01) |
| ***H01Q 1/52*** | (2006.01) |

(52) U.S. Cl.

CPC .......... *H01Q 1/526* (2013.01); *H01Q 1/2283* (2013.01); *H01Q 1/48* (2013.01)

(58) Field of Classification Search

CPC ........ H01Q 1/526; H01Q 1/2283; H01Q 1/48; H01Q 1/22; H01Q 1/521; H01Q 21/0075; H01Q 21/065; H01Q 25/001; H01Q 1/36; H01Q 1/38; H01Q 21/00

See application file for complete search history.

(56) References Cited

U.S. PATENT DOCUMENTS

| | | | | |
|---|---|---|---|---|
| 9,935,065 | B1 * | 4/2018 | Baheti .................. | H10W 44/20 |
| 11,424,552 | B2 | 8/2022 | Chiu et al. | |
| 11,721,911 | B2 | 8/2023 | Chiu et al. | |
| 12,088,011 | B2 | 9/2024 | Chiu et al. | |
| 2009/0115754 | A1 * | 5/2009 | Kawachi ............. | H05K 1/0239 345/204 |

(Continued)

FOREIGN PATENT DOCUMENTS

| | | |
|---|---|---|
| CN | 112186359 | 1/2021 |
| CN | 117650369 | 3/2024 |

*Primary Examiner* — Dimary S Lopez Cruz
*Assistant Examiner* — Bamidele A Immanuel
(74) *Attorney, Agent, or Firm* — JCIPRNET

(57) ABSTRACT

An antenna device includes a transparent substrate and a plurality of antenna units arranged on the transparent substrate. Each antenna unit includes an antenna electrode, a ground electrode, a thin-film circuit structure, a redistribution structure and a chip. The redistribution structure includes a digital signal pad, an analog signal pad, a radio frequency (RF) signal pad, and an antenna signal pad. The chip is bonded to the digital signal pad, the analog signal pad, the RF signal pad, and the antenna signal pad. The digital signal pad and the analog signal pad are disposed in a first bonding area. The RF signal pad and the antenna signal pad are disposed in a second bonding area.

11 Claims, 15 Drawing Sheets

1A

(56) References Cited

U.S. PATENT DOCUMENTS

| | | | | |
|---|---|---|---|---|
| 2012/0021599 | A1* | 1/2012 | Hall | H10W 70/65<br>438/612 |
| 2015/0295305 | A1* | 10/2015 | Herbsommer | H01Q 1/40<br>343/873 |
| 2016/0020165 | A1* | 1/2016 | Kamgaing | H10W 70/65<br>257/532 |
| 2018/0323159 | A1* | 11/2018 | Kamgaing | H10W 44/20 |
| 2020/0028238 | A1* | 1/2020 | Park | H01Q 1/38 |
| 2020/0035625 | A1* | 1/2020 | Wang | H10P 72/74 |
| 2020/0083591 | A1* | 3/2020 | Hsieh | H01Q 1/2283 |
| 2020/0161767 | A1* | 5/2020 | Hara | H01Q 9/0414 |
| 2020/0395660 | A1* | 12/2020 | Kuroda | H01Q 1/22 |
| 2021/0005977 | A1* | 1/2021 | Franson | H01Q 21/0025 |
| 2021/0119329 | A1* | 4/2021 | Lin | H01Q 25/00 |
| 2021/0126341 | A1* | 4/2021 | Mizunuma | H01Q 1/2283 |
| 2021/0242593 | A1* | 8/2021 | Im | H01Q 9/045 |
| 2021/0351518 | A1* | 11/2021 | Gorbachov | H01Q 1/2208 |
| 2021/0384615 | A1* | 12/2021 | Jia | H01Q 21/065 |
| 2022/0255238 | A1* | 8/2022 | Yu | H01Q 21/0025 |
| 2022/0368003 | A1* | 11/2022 | Chiang | H01Q 9/0485 |
| 2022/0415802 | A1* | 12/2022 | Kim | H10W 44/20 |
| 2023/0019144 | A1* | 1/2023 | Lee | H01Q 1/2283 |

* cited by examiner

ANTENNA DEVICE

CROSS-REFERENCE TO RELATED APPLICATION

This application claims the priority benefit of U.S. Provisional Patent Application No. 63/606,806, filed on Dec. 6, 2023 and Taiwan Application No. 113127157, filed on Jul. 19, 2024. The entirety of each of the above-mentioned patent applications is hereby incorporated by reference herein and made a part of this specification.

BACKGROUND

Technical Field

The present disclosure relates to an antenna device.

Description of Related Art

In contemporary society, the application of wireless communication technology has become ubiquitous. The provision of wireless local area networks has become an essential facility in major urban centers and public spaces, with many individuals also establishing their own wireless networks within their domiciles. Concomitant with the advancement of wireless communication technology, numerous manufacturers have dedicated their efforts to the development of antenna devices with enhanced performance capabilities. Presently, antenna devices incorporate intricate internal circuit designs, involving diverse signal types. In the event that the signal lines are in excessively close proximity to one another, there exists a heightened probability of signal interference, potentially resulting in a detrimental impact on the performance efficacy of the antenna device.

SUMMARY

The present disclosure provides an antenna device that mitigates the issue of signal interference.

At least one embodiment of the present disclosure provides an antenna device, including a transparent substrate and multiple antenna units disposed on the transparent substrate. Each antenna unit includes an antenna electrode, a ground electrode, a thin-film circuit structure, a redistribution structure, and a chip. The antenna electrode is disposed on a first surface of the transparent substrate. The ground electrode is disposed on a second surface of the transparent substrate opposite to the first surface. The thin-film circuit structure is disposed on the ground electrode and includes a digital signal line. The redistribution structure is disposed on the thin-film circuit structure and includes a digital signal pad electrically connected to the digital signal line, an analog signal line, an analog signal pad electrically connected to the analog signal line, a radio frequency (RF) signal line, a radio frequency (RF) signal pad electrically connected to the RF signal line, and an antenna signal pad electrically connected to the antenna electrode. The chip is bonded to the digital signal pad, the analog signal pad, the RF signal pad, and the antenna signal pad. The digital signal pad and the analog signal pad are disposed in a first bonding area. The RF signal pad and the antenna signal pad are disposed in a second bonding area separated from the first bonding area.

At least one embodiment of the present disclosure provides an antenna device, including a transparent substrate and multiple antenna units disposed on the transparent substrate. Each antenna unit includes an antenna electrode, a ground electrode, a thin-film circuit structure, a redistribution structure, and a chip. The antenna electrode is disposed on a first surface of the transparent substrate. The ground electrode is disposed on a second surface of the transparent substrate opposite to the first surface. The thin-film circuit structure is disposed on the ground electrode. The redistribution structure is disposed on the thin-film circuit structure and includes a first ground structure, a second ground structure separated from the first ground structure, a dielectric layer, a first pad, and a second pad. The first ground structure and the second ground structure overlap with the ground electrode. The dielectric layer is disposed on the first ground structure and the second ground structure. The first pad and the second pad are disposed on the dielectric layer. The first pad overlaps with the first opening of the first ground structure. The second pad overlaps with a second opening in the second ground structure. The first ground structure and the first pad overlap with a first bonding area. The second ground structure and the second pad overlap with a second bonding area separated from the first bonding area. The chip overlaps with both the first bonding area and the second bonding area, and is bonded to the first pad and the second pad.

DESCRIPTION OF THE EMBODIMENTS

Figure 1:
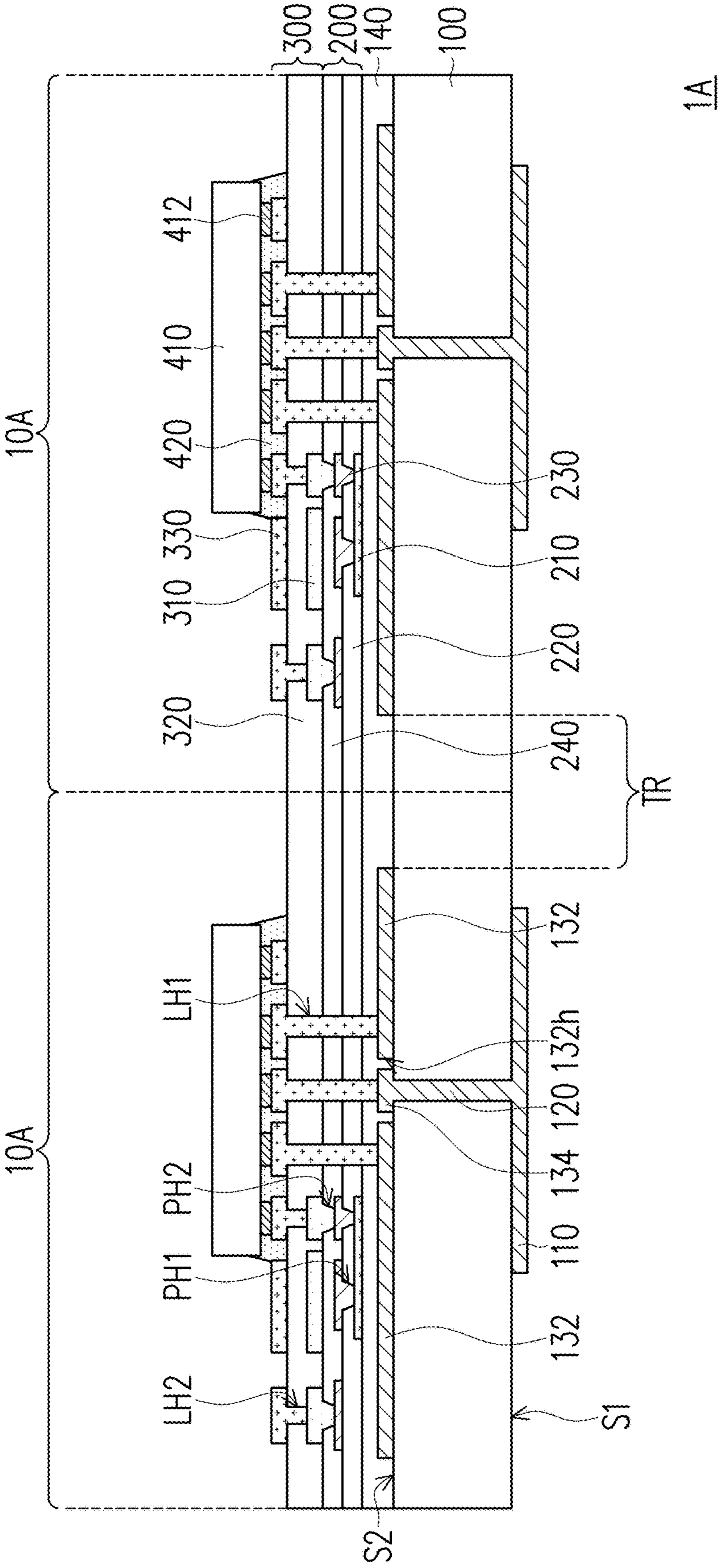
FIG. 1 is a schematic cross-sectional view of an antenna device according to an embodiment of the present disclosure.

FIG. 1 is a cross-sectional view of an antenna device 1A according to an embodiment of the present disclosure. Referring to FIG. 1A, the antenna device 1A includes a transparent substrate 100 and multiple antenna units 10A disposed on the transparent substrate 100. The antenna units 10A are, for example, arranged in an array, with a light-transmitting region TR between the antenna units 10A. In some embodiments, the antenna device 1A may be applied to, for instance, windows of transportation vehicles (such as automobile sunroofs) or windows of buildings.

The transparent substrate 100 has a first surface S1 and a second surface S2 opposite to the first surface S1. In some embodiments, the material of the transparent substrate 100 includes glass, quartz, organic polymer, or other applicable materials. In some embodiments, the thickness of the transparent substrate 100 ranges from 0.15 mm to 1.1 mm. For example, the thickness of the transparent substrate 100 may be 0.5 mm, 0.7 mm, or 1.1 mm.

Each antenna unit 10A includes an antenna electrode 110, a ground electrode 132, a thin-film circuit structure 200, a redistribution structure 300, and a chip 410.

The antenna electrode 110 is disposed on the first surface S1 of the transparent substrate 100.

The ground electrode 132 is disposed on the second surface S2 of the transparent substrate 110. In the present embodiment, the ground electrode 132 has at least one opening 132*h*, and each opening 132*h* has a bonding structure 134. The bonding structure 134 is electrically connected to the antenna electrode 110 through the substrate conductive via 120. Consequently, the antenna signal of the antenna electrode 110 may be transmitted through the bonding structure 134 and the substrate conductive via 120. In alternative embodiments, the substrate conductive via 120 may be omitted, and the antenna signal of the antenna electrode 110 may be transmitted by means of radiation between the antenna electrode and the driving electrode (not shown) overlapping with the opening 132*h*.

In some embodiments, the materials of the antenna electrode 110, the ground electrode 132, the bonding structure 134, and the substrate conductive via 120 include, but are not limited to, copper (Cu), aluminum (Al), gold (Au), silver (Ag), titanium (Ti), nickel (Ni), tungsten (W), conductive oxides (such as indium tin oxide, indium zinc oxide, etc.), or other suitable materials, or a combination thereof.

In some embodiments, the method of forming the substrate conductive via 120 includes a glass modification process and a conductive material filling process. By way of example, a laser is initially utilized to create a through-hole in the transparent substrate 100, followed by a wet etching process to enlarge the aforementioned through-hole, thereby forming a via extending from the first surface S1 to the second surface S2. Finally, conductive material is filled into the via to form the substrate conductive via 120. In some embodiments, the angle between the sidewall of the substrate conductive via 120 and either the first surface S1 or the second surface S2 (i.e., the inclination angle of the sidewall of the substrate conductive via 120) ranges from 88 degrees to 90 degrees.

In some embodiments, the method of forming the antenna electrode 110, the ground electrode 132, the bonding structure 134, and the substrate conductive via 120 include initially depositing a seed layer on the first surface S1 and second surface S2 of the transparent substrate 100, as well as within the via in the substrate, by means of sputtering, electroless plating, or other suitable processes. Subsequently, a metal layer is formed on the seed layer utilizing an electroplating process. The resultant seed layer and metal layer may be patterned through photolithographic and etching processes to obtain the antenna electrode 110, the ground electrode 132, and the bonding structure 134. In alternative embodiments, the seed layer may be omitted.

The buffer layer 140 is disposed on the transparent substrate 100, the ground electrode 132, and the bonding structure 134. In some embodiments, the buffer layer 140 includes transparent materials, such as organic materials (e.g., polyimide, polyethylene terephthalate, epoxy resin, etc.) or inorganic materials (e.g., silicon nitride, silicon oxide, etc.) or a combination thereof. In some embodiments, given that the thickness of the antenna electrode 110, the ground electrode 132, and the bonding structure 134 ranges from 2 micrometers to 10 micrometers, to achieve a planarization effect, the thickness of the buffer layer 140 is preferably between 2 micrometers and 15 micrometers, and the thickness of the buffer layer 140 is not less than that of the ground electrode 132. For instance, the thickness of the buffer layer 140 may be 1.3 times that of the ground electrode 132. To attain this thickness for achieving the planarization effect, it is preferable to select organic materials for the buffer layer 140.

The thin-film circuit structure 200 is disposed on the ground electrode 132 and the bonding structure 134. In the present embodiment, the thin-film circuit structure 200 is disposed on the buffer layer 140. In some embodiments, the overall thickness of the thin-film circuit structure 200 is less than 10 micrometers.

The thin-film circuit structure 200 includes, in sequential deposition order, a first thin-film conductive layer 210, a first dielectric layer 220, a second thin-film conductive layer 230, and a second dielectric layer 240. In some embodiments, at least one contact portion PH1 of the second thin-film conductive layer 230 penetrates through the first dielectric layer 220 and is electrically connected to the first thin-film conductive layer 210. In some embodiments, the thin-film circuit structure 200 may further include additional conductive layers and dielectric layers. The present disclosure does not limit the number of conductive layers and dielectric layers in the thin-film circuit structure 200.

In some embodiments, the materials of the first thin-film conductive layer 210 and the second thin-film conductive layer 230 include copper (Cu), aluminum (Al), gold (Au), silver (Ag), titanium (Ti), nickel (Ni), tungsten (W), conductive oxides (such as indium tin oxide, indium zinc oxide, etc.), or other suitable materials or combinations thereof. The first thin-film conductive layer 210 and the second thin-film conductive layer 230 each possess either a single-layer structure or a multi-layer structure. By way of example, the first thin-film conductive layer 210 and the second thin-film conductive layer 230 each has a molybdenum/aluminum/molybdenum laminated structure, a titanium/aluminum/titanium laminated structure, or other laminated structures composed of conductive materials.

In some embodiments, the materials of the first dielectric layer 220 and the second dielectric layer 240 include organic polymers (such as polyimide, polyethylene terephthalate, etc.) or inorganic materials (such as silicon oxide, silicon nitride, silicon oxynitride, aluminum oxide, zirconium oxide, hafnium oxide, or other suitable materials, or combinations thereof).

In some embodiments, prior to the formation of the second thin-film conductive layer 230, an opening exposing the first thin-film conductive layer 210 is formed in the first dielectric layer 220 utilizing photolithography and etching processes. Subsequently, the second thin-film conductive layer 230 is deposited within the opening to form a contact portion PH1 of the second thin-film conductive layer 230, thereby enabling the second thin-film conductive layer 230 to make contact with the first thin-film conductive layer 210. In some embodiments, the angle between the sidewall and the bottom surface of the contact portion PH1 (i.e., the inclination angle of the sidewall of the contact portion PH1) ranges from 50 degrees to 70 degrees.

The redistribution structure 300 is disposed on the thin-film circuit structure 200. In this embodiment, the redistribution structure 300 is disposed on the second dielectric layer 240.

The redistribution structure 300 includes, in sequential deposition order, a first redistribution layer 310, an insulating layer 320, and a second redistribution layer 330. In some embodiments, at least one contact portion PH2 of the first redistribution layer 310 penetrates through the second dielectric layer 240 and is electrically connected to the second thin-film conductive layer 230. In some embodiments, the first redistribution layer 310 and/or the second redistribution layer 330 are electrically connected to the ground electrode 132 and the bonding structure 134 through the conductive via LH1. The conductive via LH1 penetrates the thin-film circuit structure 200 and the buffer layer 140, and optionally penetrates the insulating layer 320. In some embodiments, the second redistribution layer 330 is electrically connected to the first redistribution layer 310 through at least one conductive via LH2 in the insulating layer 320. The redistribution structure 300 may further include additional conductive layers and insulating layers, and the present disclosure does not limit the number of conductive layers and insulating layers in the redistribution structure 300.

In some embodiments, the materials of the first redistribution layer 310 and the second redistribution layer 330 include copper (Cu), aluminum (Al), gold (Au), silver (Ag), titanium (Ti), nickel (Ni), tungsten (W), conductive oxides (such as indium tin oxide, indium zinc oxide, etc.), or other suitable materials or combinations thereof. In some embodiments, each of the first redistribution layer 310 and the second redistribution layer 330 includes a seed layer and a metal layer formed thereon. The seed layer may be formed by methods such as sputtering, electroless plating, or other suitable techniques, while the metal layer is formed by electroplating. In some embodiments, the seed layer may be omitted.

In some embodiments, the material of the insulating layer 320 includes organic materials (such as polyimide, polyethylene terephthalate, epoxy resin, etc.) or inorganic materials (such as silicon nitride, silicon oxide, etc.) or a combination thereof. In some embodiments, the method of forming the insulating layer 320 includes adhering a dry film onto the first redistribution layer 310 or coating a liquid organic material (e.g., liquid polyimide (PI) material) onto the first redistribution layer 310.

In some embodiments, the insulating layer 320 possesses high transmittance and low dissipation factor (Df). By way of example, the insulating layer 320 exhibits a transmittance greater than or equal to 90% for light with wavelengths ranging from 400 nm to 800 nm. In some embodiments, the insulating layer 320 has a dielectric constant (Dk) lower than 4 and a dissipation factor lower than 0.004.

In some embodiments, the first redistribution layer 310 of the redistribution structure 300 is configured to transmit ground signals, while the second redistribution layer 330 is configured to transmit chip power signals and radio frequency (RF) signals (e.g., RF input signals (RF_in)). In some embodiments, the first thin-film conductive layer 210 and the second thin-film conductive layer 230 of the thin-film circuit structure 200 have digital signal lines and analog signal lines, which are respectively configured to transmit digital signals and analog signals for controlling the chip 410 or circuits within the circuit structure 200. Due to the lower operating frequencies of the digital and analog signals transmitted within the thin-film circuit structure 200, significant signal loss is not incurred despite the relatively thin-film thicknesses of the first thin-film conductive layer 210, the first dielectric layer 220, the second thin-film conductive layer 230, and the second dielectric layer 240 in the thin-film circuit structure 200. In contrast, as the redistribution structure 300 is utilized for transmitting high-frequency RF signals, the insulating layer 320 in the redistribution structure 300 necessitates a greater thickness. Consequently, the thickness of the insulating layer 320 exceeds that of each of the first dielectric layer 220 and the second dielectric layer 240. In some embodiments, the thickness of the insulating layer 320 ranges from 10 micrometers to 60 micrometers. In some embodiments, the thickness of each of the first dielectric layer 220 and the second dielectric layer 240 ranges from 0.03 micrometers to 1 micrometer, for example, from 0.5 micrometers to 1 micrometer or from 0.7 micrometers to 1 micrometer. In some embodiments, the thickness of each of the first thin-film conductive layer 210 and the second thin-film conductive layer 230 is less than the thickness of each of the first redistribution layer 310 and the second redistribution layer 330. In some embodiments, the thickness of each of the first thin-film conductive layer 210 and the second thin-film conductive layer 230 ranges from 0.01 micrometers to 0.7 micrometers, for example, from 0.01 micrometers to 0.3 micrometers or from 0.01 micrometers to 0.05 micrometers. In some embodiments, the thickness of each of the first redistribution layer 310 and the second redistribution layer 330 ranges from 2 micrometers to 10 micrometers.

In some embodiments, prior to the formation of the first redistribution layer 310, an opening exposing the second thin-film conductive layer 230 is formed in the second dielectric layer 240 using photolithography and etching processes. Subsequently, the first redistribution layer 310 is deposited within the opening to form a contact portion PH2 of the first redistribution layer 310, thereby enabling contact between the first redistribution layer 310 and the second thin-film conductive layer 230. In some embodiments, the angle between the sidewall and the bottom surface of the contact portion PH2 (i.e., the inclination angle of the sidewall of the contact portion PH2) ranges from 50 degrees to 70 degrees.

In some embodiments, prior to the formation of the first redistribution layer 310 or the second redistribution layer 330, a laser drilling process is conducted. For instance, the laser drilling process is performed to create laser holes, which are subsequently filled with the first redistribution layer 310 or the second redistribution layer 330 to form conductive vias LH1 or LH2. In the present embodiment, the conductive via LH2 penetrates the insulating layer 320, and the second redistribution layer 330 contacts the first redistribution layer 310 through the conductive via LH2. The conductive via LH1 penetrates the insulating layer 320, the second dielectric layer 240, the first dielectric layer 220, and the buffer layer 140, enabling the second redistribution layer 330 to contact the ground electrode 132 and the bonding structure 134 through the conductive via LH1. In some embodiments, the angle between the sidewall and the bottom surface of the conductive vias LH1 and LH2 (i.e., the inclination angle of the sidewalls of the conductive vias LH1 and LH2) ranges from 70 degrees to 75 degrees. In this embodiment, due to the distinct formation methods of the contact portions PH1 and PH2, the conductive vias LH1 and LH2, and the substrate conductive via 120, these three elements exhibit different sidewall inclination angles.

The chip 410 is bonded to the second redistribution layer 330. In some embodiments, the antenna electrode 110 has a width that is greater than or equal to the width of chip 410.

In some embodiments, the chip 410 is bonded to the second redistribution layer 330 through the conductive connection structures 412. The conductive connection structure 412 may include, for example, solder, conductive adhesive, or other suitable structures. In some embodiments, the surface of the second redistribution layer 330 may be treated with Electroless Nickel Immersion Gold (ENIG), immersion silver plating, or similar processes to enhance the yield of the chip bonding process. In some embodiments, prior to the chip bonding process, an Organic Solderability Preservative (OSP) or other organic material may be formed on the second redistribution layer 330 to protect the metal pads from corrosion (e.g., sulfidation or oxidation) due to air exposure, thereby improving the yield of the chip bonding process. In some embodiments, the spacing between the conductive connection structure 412 ranges from 100 micrometers to 1000 micrometers.

A bottom fill material 420 is formed between the chip 410 and the second redistribution layer 330. In some embodiments, the bottom fill material 420 is disposed between the chip 410 and the redistribution structure 300, and surrounds the points of contact (i.e., the conductive connection structure 412) between the chip 410 and the redistribution structure 300. In some embodiments, the bottom fill material 420 may include a thermal interface material (TIM) to facilitate heat dissipation from the chip 410. By way of example, the thermal conductivity coefficient of the bottom fill material 420 exceeds 0.3 W/m K.

In some embodiments, the chip 410 includes a Beamformer Integrated Circuit (BFIC) or other active/passive components. In some embodiments, the BFIC includes a variable gain amplifier (VGA); a phase shifter (PS); a signal control and memory circuit; a power amplifier (PA) and/or a low noise amplifier (LNA). In some embodiments, circuits containing active components may be disposed within the thin-film circuit structure 200, thereby reducing the circuits required within the chip 410, thus enabling a reduction in the dimensions of the chip 410. For instance, the signal control and memory circuit of the BFIC may be disposed within the thin-film circuit structure 200. In some embodiments, by incorporating a chip 410 in each antenna unit 10A, the signal path between the chip 410 and the antenna electrode 110 may be shortened. Should a single chip 410 provide signals to multiple antenna electrodes, additional signal paths would be necessary, consequently diminishing the light-transmissive area of the antenna device. In other words, the present embodiment enhances the light-transmissive area of the antenna device 1A by incorporating a chip 410 in each antenna unit 10A.

In some embodiments, an Up/Down Converter (UDC) may be utilized to convert signals of relatively lower frequency (such as signals below 2 GHz or other Intermediate Frequency (IF) or low-frequency signals) into high-frequency Radio Frequency (RF) signals. These high-frequency RF signals are subsequently transmitted to the chip 410.

In the present embodiment, the chip 410 is bonded to multiple pads in the second redistribution layer 330. These pads are configured for transmitting various signals. For instance, ground signals (e.g., AGND, DGND, RF_GND, etc.), power signals (e.g., AVDD, DVDD, etc.), radio frequency (RF) signals, RF enable signals (RF_en), reference voltage signals (Vref), bias regulation signals (Rbias), circuit control signals (e.g., digital signals such as CS, CLK, SDI, SDO, PDI, etc.), and antenna signals (e.g., horizontally polarized electric field antenna signals (RF_out_H), vertically polarized electric field antenna signals (RF_out_V), etc.). In some embodiments, at least a portion of the circuit control signals is provided by an external circuit board (not shown). For example, these signals may be provided by a Field Programmable Gate Array (FPGA) and a power module on the external circuit board.

In some embodiments, the usage descriptions of various signals and the main transmission layers are shown in Table 1.

TABLE 1

| Signal | Usage description | Main transmission layer |
|---|---|---|
| Power signal AVDD | The power module supplies system analog power signals to the UDC and BFIC (For example, PS, PA, and/or LNA within the BFIC). | The second redistribution layer |
| Ground signal AGND | Provide system analog ground signal to UDC and BFIC | The first redistribution layer |
| Power signal DVDD | The power module supplies system digital power signals to UDC and BFIC | The first and/or second thin-film conductive layer |
| Ground signal DGND | Connect to the ground signal AGND and provide the system analog ground signal to the thin-film circuit structure | The first and/or second thin-film conductive layer |
| RF signal | Transmission between UDC and BFIC may be sending signals or receiving signals | The second redistribution layer |
| Ground signal RF_GND | Provide RF analog ground signal to UDC and BFIC | The first redistribution layer and/or the second redistribution layer |
| Reference voltage signal Vref | The power module supplies the reference voltage to the BFIC (such as the PS in the BFIC) | The first and/or second thin-film conductive layer |
| Bias regulation signal Rbias | Adjust the bias voltage of the PA and/or LNA in the BFIC | The second redistribution layer |
| Antenna signal Rf_out | Transmission between BFIC and antenna electrode | The first redistribution layer and/or the second redistribution layer |
| RF enable signal RF_en | Control the startup and shutdown of radio frequency circuits or modules to enable the antenna electrode to send or receive signals | The first and/or second thin-film conductive layer |

TABLE 1-continued

| Signal | Usage description | Main transmission layer |
|---|---|---|
| Circuit control signal CS | Provides chip select signal to BFIC to enable read/write operations | The first and/or second thin-film conductive layer |
| Circuit control signal CLK | Provide clock signal to BFIC | The first and/or second thin-film conductive layer |
| Circuit control signal SDI | Serial data input signal of BFIC | The first and/or second thin-film conductive layer |
| Circuit control signal SDO | Serial data output signal of BFIC | The first and/or second thin-film conductive layer |
| Circuit control signal PDI | Input signal for parallel data of BFIC | The first and/or second thin-film conductive layer |

In some embodiments, to mitigate interference between high-frequency signals and low-frequency signals, the chip pads corresponding to low-frequency signals are aggregated in a first bonding area, while the chip pads corresponding to high-frequency signals are aggregated in a second bonding area, which is segregated from the first bonding area.

The low-frequency signals may be analog signals or digital signals, and include power signals (such as AVDD, DVDD, and the like), radio frequency enable signals (RF_en), reference voltage signals (Vref), bias regulation signals (Rbias), and circuit control signals (such as CS, CLK, SDI, SDO, PDI, and the like), wherein the chip pads corresponding to the aforementioned low-frequency signals (for example, digital signal pads connected to digital signal lines and analog signal pads connected to analog signal lines) are aggregated in the first bonding area.

High-frequency signals include, but are not limited to, RF signals and antenna signals (RF_out). The chip pads corresponding to the aforementioned high-frequency signals (e.g., the RF signal pad connected to the RF signal line and the antenna signal pad connected to the antenna signal line) are aggregated in the second bonding area. For the purposes of this document, low-frequency signals are defined as signals operating at frequencies below 500 MHz, whereas high-frequency signals are defined as signals operating at frequencies above 500 MHz (e.g., 10 GHz to 300 GHz or 10 GHz to 500 GHz).

In some embodiments, the ground signal AGND and the ground signal RF_GND may be utilized for shielding purposes to mitigate signal interference. In some embodiments, a first ground structure for transmitting the ground signal AGND is disposed in the first bonding area, while a second ground structure for transmitting the ground signal RF_GND is disposed in the second bonding area. By maintaining separation between the first ground structure and the second ground structure, further reduction of mutual interference between high-frequency and low-frequency signals may be achieved. Detailed descriptions of the first ground structure and the second ground structure are provided in subsequent embodiments.

In some embodiments, the ground signal DGND is primarily transmitted within the thin-film circuit structure 200, which is primarily utilized for the transmission of low-frequency signals. To mitigate the impact of low-frequency signals on high-frequency signals, it is preferable to position the chip pad corresponding to the ground signal DGND within the first bonding area.

Figure 2:
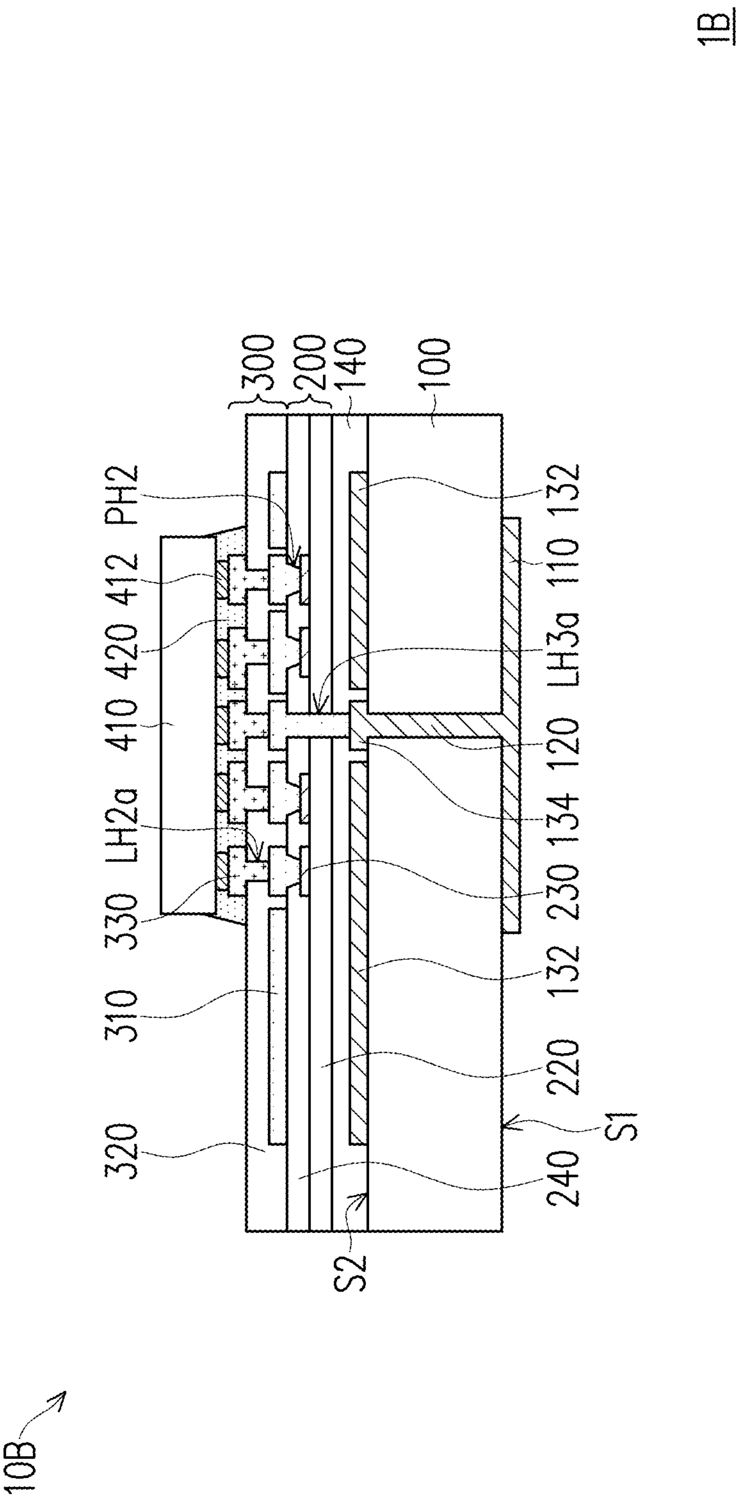
FIG. 2 is a schematic cross-sectional view of an antenna device according to an embodiment of the present disclosure.
Figure 3:
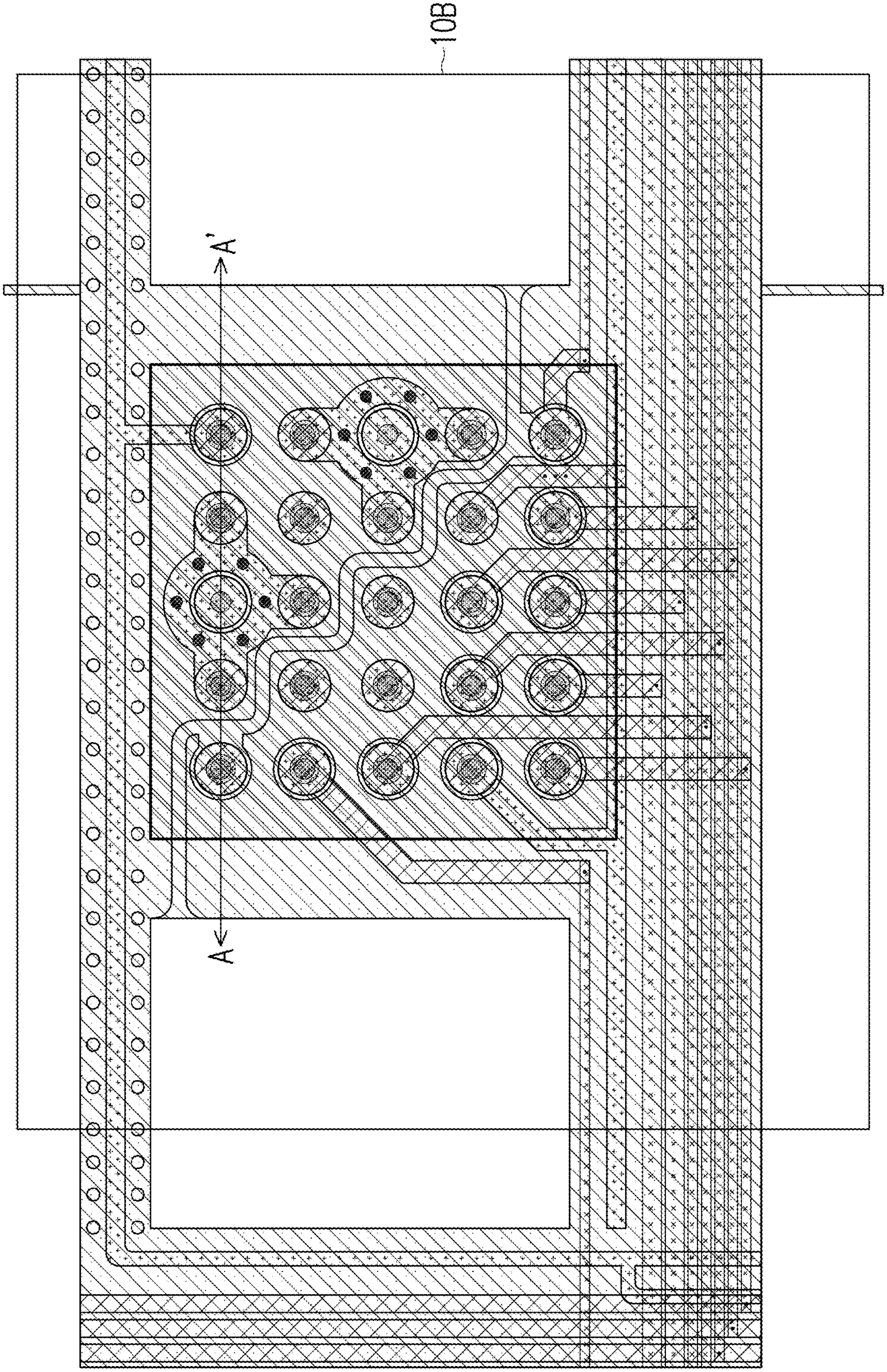
FIG. 3 is a schematic top view of an antenna device according to an embodiment of the present disclosure.

FIG. 2 is a cross-sectional view of an antenna device 1B according to an embodiment of the present disclosure. The antenna device 1B includes an array of antenna units 10B; for the purpose of clarity, FIG. 2 illustrates only one antenna unit 10B. FIG. 3 is a top view of an antenna device 1B according to an embodiment of the present disclosure. FIG. 4A to FIG. 4F are top views of the respective conductive layers in the antenna unit 10B of FIG. 3. FIG. 2 corresponds to the position of line A-A' in FIG. 3 to FIG. 4F.

The following must be noted: The embodiments illustrated in FIG. 2 through FIG. 4F incorporate component designations and certain content from the embodiment shown in FIG. 1. Identical or similar numerical designations are employed to denote identical or similar components. Explanations of technical content that remain consistent have been omitted. For elucidation on the omitted portions, please refer to the aforementioned embodiment. Redundant explanations will not be provided herein.

Figure 4A:
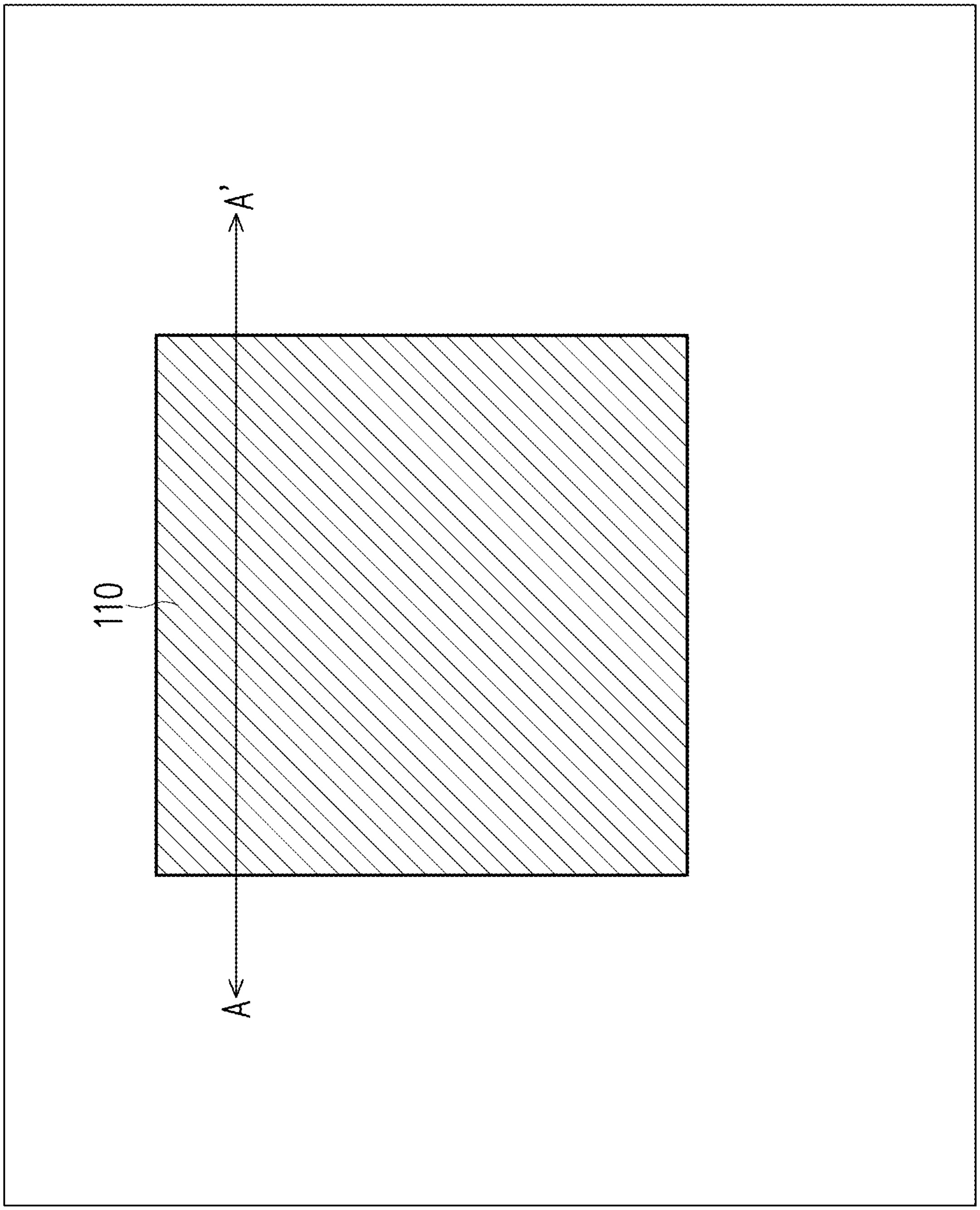
FIG. 4A to FIG. 4F are top views of respective conductive layer in the antenna unit 10B of FIG. 3.

Please refer to FIG. 2, FIG. 3 and FIG. 4A. The antenna electrode 110 is disposed on the first surface S1 of the transparent substrate 100.

Figure 4B:
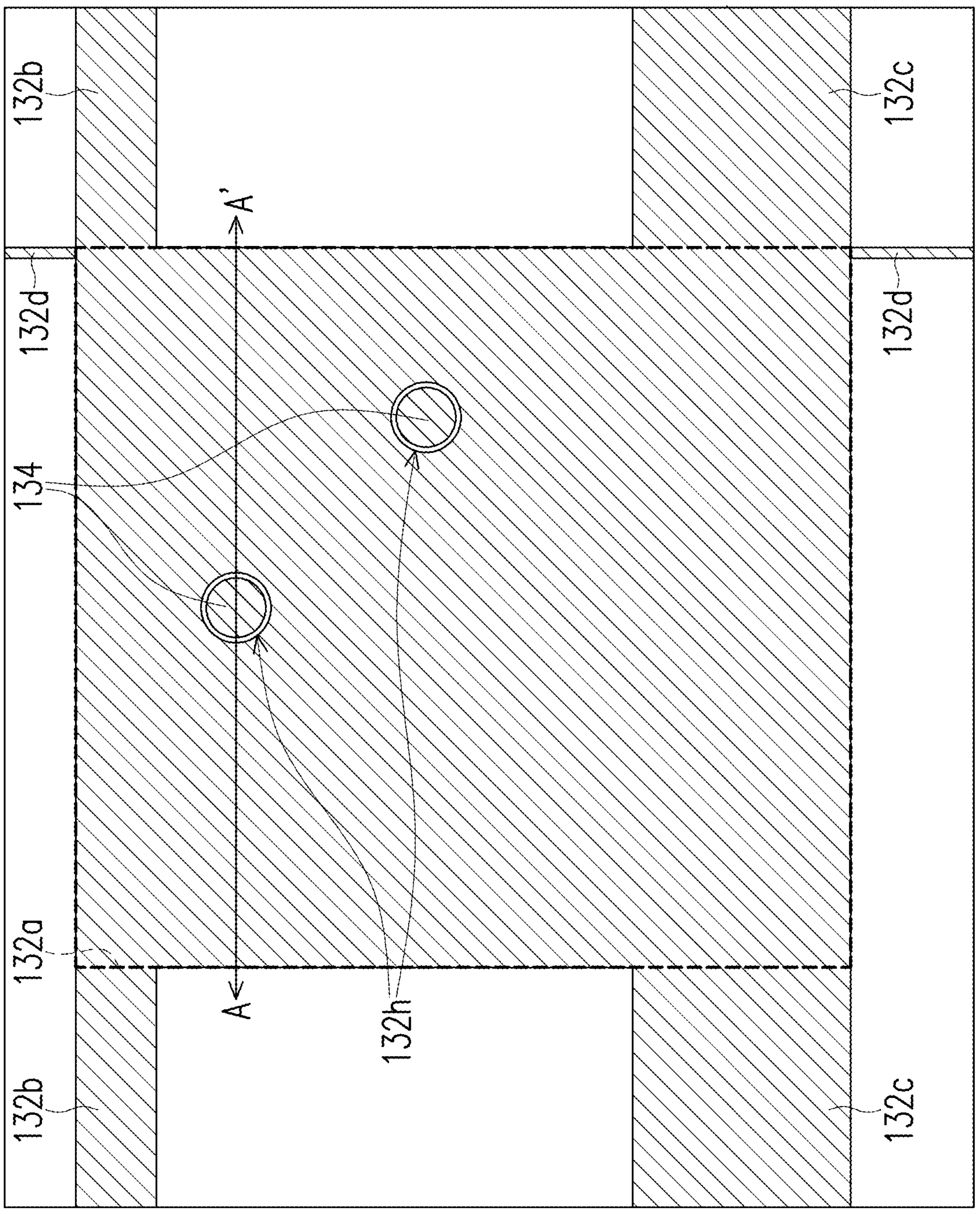

Please refer to FIG. 2, FIG. 3, and FIG. 4B. The ground electrode 132 and the bonding structures 134 are disposed on the second surface S2 of the transparent substrate 110. In this embodiment, the ground electrode 132 has two openings 132*h*, and the two bonding structures 134 are respectively disposed within the two openings 132*h*. The two bonding structures 134 are electrically connected to the antenna electrode 110 through two substrate conductive vias 120, respectively. By way of example, one is utilized for transmitting horizontally polarized electric field signals, while the other is utilized for transmitting vertically polarized electric field signals.

In this embodiment, the ground electrode 132 includes a block portion 132*a* and wire portions 132*b*, 132*c*, and 132*d* extending outwardly from the block portion 132*a*. The block portion 132*a* overlaps with the antenna electrode 110. In some embodiments, the width of the block portion 132*a* is greater than or equal to the width of the antenna electrode 110. The wire portion 132*b* is substantially parallel to the wire portion 132*c*, and extends from the block portion 132*a* in opposite directions. The wire portion 132*d* is substantially perpendicular to the wire portion 132*c*, and extends from the block portion 132*a* in two other directions. In some embodiments, the area not covered by the ground electrode 132 is defined as the light-transmitting region of the antenna unit 10B.

Figure 4C:
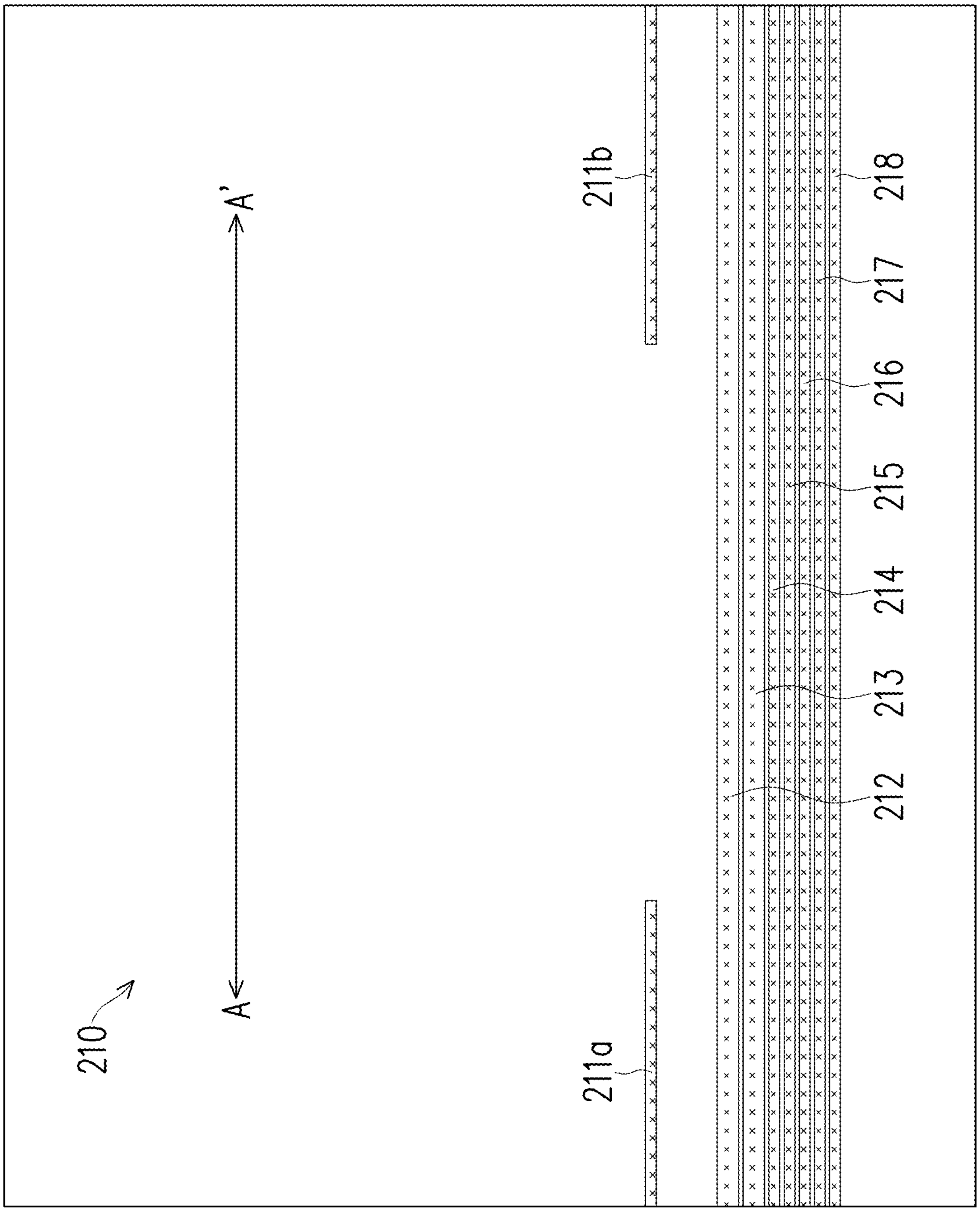

Please refer to FIG. 2, FIG. 3, and FIG. 4C. The first thin-film conductive layer 210 includes multiple signal lines 211*a*, 211*b*, 212, 213, 214, 215, 216, 217, and 218. In some embodiments, the signal line 211*a* is utilized for transmitting the circuit control signal SDI. In some embodiments, the signal line 211*b* is utilized for transmitting the circuit control signal SDO. In some embodiments, the signal line 212 is utilized for transmitting the power signal DVDD. In some embodiments, the signal line 213 is utilized for transmitting the ground signal DGND. In some embodiments, the signal line 214 is utilized for transmitting the reference voltage signal Vref. In some embodiments, the signal line 215 is utilized for transmitting the radio frequency enable signal RF_en. In some embodiment, the signal line 216 is utilized for transmitting the circuit control signal CS. In some embodiments, the signal line 217 is utilized for transmitting the circuit control signal CLK. In some embodiments, the signal line 218 is utilized for transmitting the circuit control signal PDI.

In some embodiments, the arrangement sequence of signal lines 211*a*, 211*b*, 212, 213, 214, 215, 216, 217, and 218 may be adjusted according to practical requirements. In some embodiments, the signal lines 211*a*, 211*b*, 212, 213, 214, 215, 216, 217, and 218 overlap with the ground electrode 132, for instance, with the block portion 132*a* and the wire portion 132*c* of the ground electrode 132.

In some embodiments, the signal lines 211*a*, 211*b*, 215, 216, 217, and 218 may also be referred to as digital signal lines, whereas signal lines 212, 213, and 214 may also be referred to as analog signal lines.

Please refer to FIG. 2, FIG. 3, and FIG. 4C, and FIG. 4 D. The second thin-film conductive layer 230 includes multiple first conductive features 231*a*, 231*b*, 231*c*, 231*d*, and 231*e*, and multiple second conductive features 232*a* and 232*b*. In this embodiment, the first conductive feature 231*c* extends respectively from above the corresponding signal lines 211*a*, 211*b*, 212, 214, 215, 216, 217, and 218 to beneath the chip 410, wherein the first conductive feature 231*c* is connected to the signal lines 211*a*, 211*b*, 212, 214, 215, 216, 217, and 218 through the corresponding contact portion PH1. The first conductive feature 231*e* is connected to the signal line 213 through the corresponding contact portion PH1. The first conductive features 231*a*, 231*b*, 231*d* and the second conductive features 232*a* and 232*b* are disposed beneath the chip 410.

In some embodiments, the first conductive feature 231*a* and the first conductive feature 231*e* are configured to transmit ground signals AGND/DGND. In some embodiments, one or more first conductive features 231*e* include an extension portion 231*a*-1, which may extend between two adjacent first conductive features 231*c*. In the present embodiment, the extension portion 231*a*-1 is disposed between a first conductive feature 231*c* designated for transmitting the reference voltage signal Vref and another first conductive feature 231*c* designated for transmitting the circuit control signal SDO.

Please refer to FIG. 2, FIG. 3, FIG. 4D, and FIG. 4E. The first redistribution layer 310 includes a first ground structure 314 and a second ground structure 313, which are separated from each other; multiple first transition structures 311*b*, 311*c*, 311*d*, and 311*e*; and multiple second transition structures 312*b* and 312*c*.

The first ground structure 314 and the first transition structures 311*b*, 311*c*, 311*d*, and 311*e* overlap with the first bonding area BR1. The second ground structure 313 and the second transition structures 312*b* and 312*c* overlap with the second bonding area BR2. At least a portion of the first transition structures 311*b*, 311*c*, 311*d*, and 311*e* is surrounded by the first ground structure 314. More specifically, each of the first transition structures 311*b*, 311*c*, 311*d*, and 311*e* is either completely or partially surrounded by the first ground structure 314, thereby reducing signal interference on the first transition structures 311*b*, 311*c*, 311*d*, and 311*e*. Similarly, at least a portion of the second transition structures 312*b* and 312*c* is surrounded by the second ground structure 313. More specifically, each of the second transition structures 312*b* and 312*c* is either completely or partially surrounded by the second ground structure 313, thereby reducing signal interference on the second transition structures 312*b* and 312*c*.

The first ground structure 314 includes the block portion 314*a* overlapping with the first bonding area BR1 and the wire portion 314*b* extending outwardly from the block portion 314*a*. The block portion 314*a* of the first ground structure 314 overlaps with the block portion 132*a* of the ground electrode 132 (refer to FIG. 4B), while the wire portion 314*b* of the first ground structure 314 overlaps with the wire portion 132*c* of the ground electrode 132 (refer to FIG. 4B). The first ground structure 314 is connected to the first conductive feature 231*a* through the corresponding contact portion PH2.

In some embodiments, the first ground structure 314 may optionally be connected to one or more extension portions 231*a*-1 of one or more first conductive features 231*a* of the second thin-film conductive layer 230 through one or more contact portions PH2-1. The width of the contact portion PH2-1 is less than the width of the contact portion PH2. In some embodiments, the contact portion PH2-1 and the extension portion 231*a*-1 may be omitted.

The second ground structure 313 includes the block portion 313*a* overlapping with the second bonding area BR2 and the wire portion 313*b* extending outwardly from the block portion 313*a*. The block portion 313*a* of the second ground structure 313 overlaps with the block portion 132*a* of the ground electrode 132 (refer to FIG. 4B), while the wire portion 313*b* of the second ground structure 313 overlaps with the wire portion 132*b* of the ground electrode 132 (refer to FIG. 4B). The first ground structure 314 is connected to the second conductive feature 232*a* through the corresponding contact portion PH2.

In this embodiment, the second ground structure 313 is connected to the corresponding first conductive feature 232*a* through multiple contact portions PH2.

In the present embodiment, the first transition structure 311*b* overlaps with the first conductive feature 231*b* and is connected to the first conductive feature 231*b* through the corresponding contact portion PH2. Multiple first transition structures 311*c* respectively overlap with multiple first conductive features 231*c* and are respectively connected to the corresponding first conductive features 231*c* through the corresponding contact portions PH2. In the present embodiment, the first transition structure 311*d* overlaps with the first conductive feature 231*d* and is connected to the corresponding first conductive feature 231*d* through the corresponding contact portion PH2.

In the present embodiment, the first transition structure 311*e* overlaps with the first conductive feature 231*e* and is connected to the corresponding first conductive feature 231*e* through the corresponding contact portion PH2, thereby connecting to the signal line 213 for transmitting the ground signal DGND through the first conductive feature 231*e*. In some embodiments, the first transition structure 311*e* is separated from the first ground structure 314; however, the present disclosure is not limited thereto. In other embodiments, the first transition structure 311*e* is integrally formed with the first ground structure 314. In other words, the first ground structure 314 is electrically connected to the signal line 213, such that the ground signal AGND on the first ground structure 314 is substantially equivalent to the ground signal DGND on the signal line 213.

In this embodiment, the second transition structure 312*b* overlaps with the second conductive feature 232*b* and is connected to the second conductive feature 232*b* through the corresponding contact portion PH2.

The multiple second transition structures 312*c* respectively overlap with the multiple bonding structures 134 and are respectively connected to the corresponding bonding structures 134 through corresponding conductive vias LH3*a*. The conductive via LH3*a* passes through the second dielectric layer 240, the first dielectric layer 220 and the buffer layer 140.

In some embodiments, the conductive via LH3*a* is formed utilizing a laser drilling process, and the angle between the sidewall and the bottom surface of the conductive via LH3*a* (i.e., the inclination angle of the sidewall of the conductive via LH3) is between 70 degrees and 75 degrees.

In the present embodiment, the second ground structure 313 is connected to the ground electrode 132 through multiple conductive vias LH3*b*. The conductive vias LH3*b* penetrate the second dielectric layer 240, the first dielectric layer 220, and the buffer layer 140. In some embodiments, the conductive vias LH3*b* are formed utilizing a laser drilling process, and the angle between the sidewall and the bottom surface of the conductive vias LH3*b* (i.e., the inclination angle of the sidewall of the conductive vias LH3*b*) is between 70 degrees and 75 degrees. The conductive vias LH3*b* are arranged around the conductive via LH3*a*.

The insulating layer 320 is disposed on the first ground structure 314, the second ground structure 313, the multiple first transition structures 311*b*, 311*c*, 311*d*, 311*e*, and the multiple second transition structures 312*b* and 312*c*.

Please refer to FIG. 2, FIG. 3, FIG. 4E, and FIG. 4F. The second redistribution layer 330 includes multiple first pads 331*a*, 331*b*, 331*c*, 331*d*, and 331*e* located in the first bonding area BR1, as well as multiple shielding layers 332*a* and multiple second pads 332*b*, 332*c* and 332*d* located in the second bonding area BR2. In this embodiment, the second redistribution layer 330 further includes the signal line 333 extending outwardly from the first bonding area BR1 and the signal line 334 extending outwardly from the second bonding area BR2. The first pads 331*a*, 331*b*, 331*c*, 331*d*, the shielding layer 332*a*, the second pad 332*b*, 332*c*, 332*d*, the signal line 333, and the signal line 334 are disposed on the insulating layer 320. The second redistribution layer 330 is connected to the first redistribution layer 310 through multiple conductive vias LH2*a* that penetrate the insulating layer 320.

The multiple first pads 331*a* are connected to the first ground structure 314 through the corresponding multiple conductive vias LH2*a*.

Figure 4D:
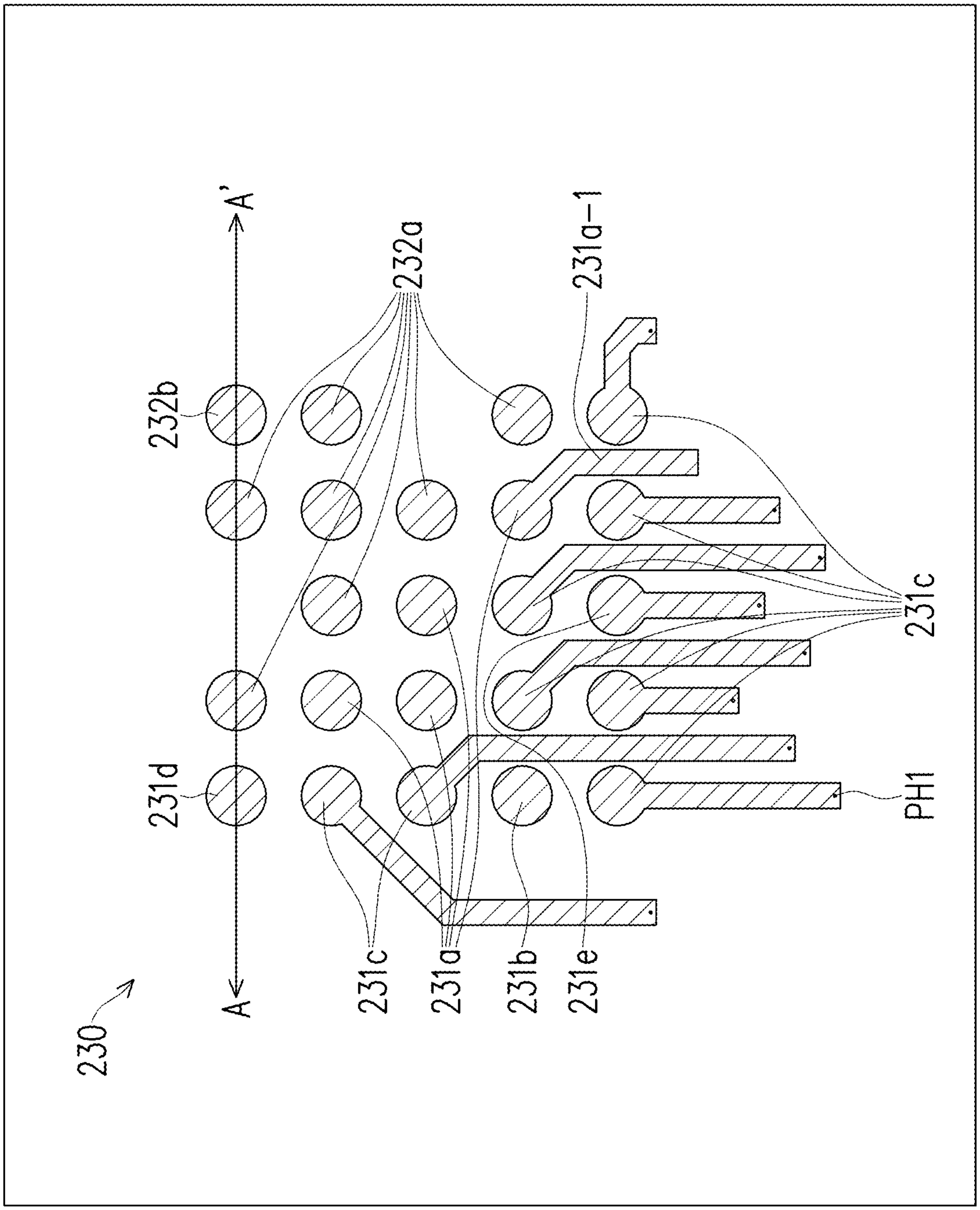
Figure 4E:
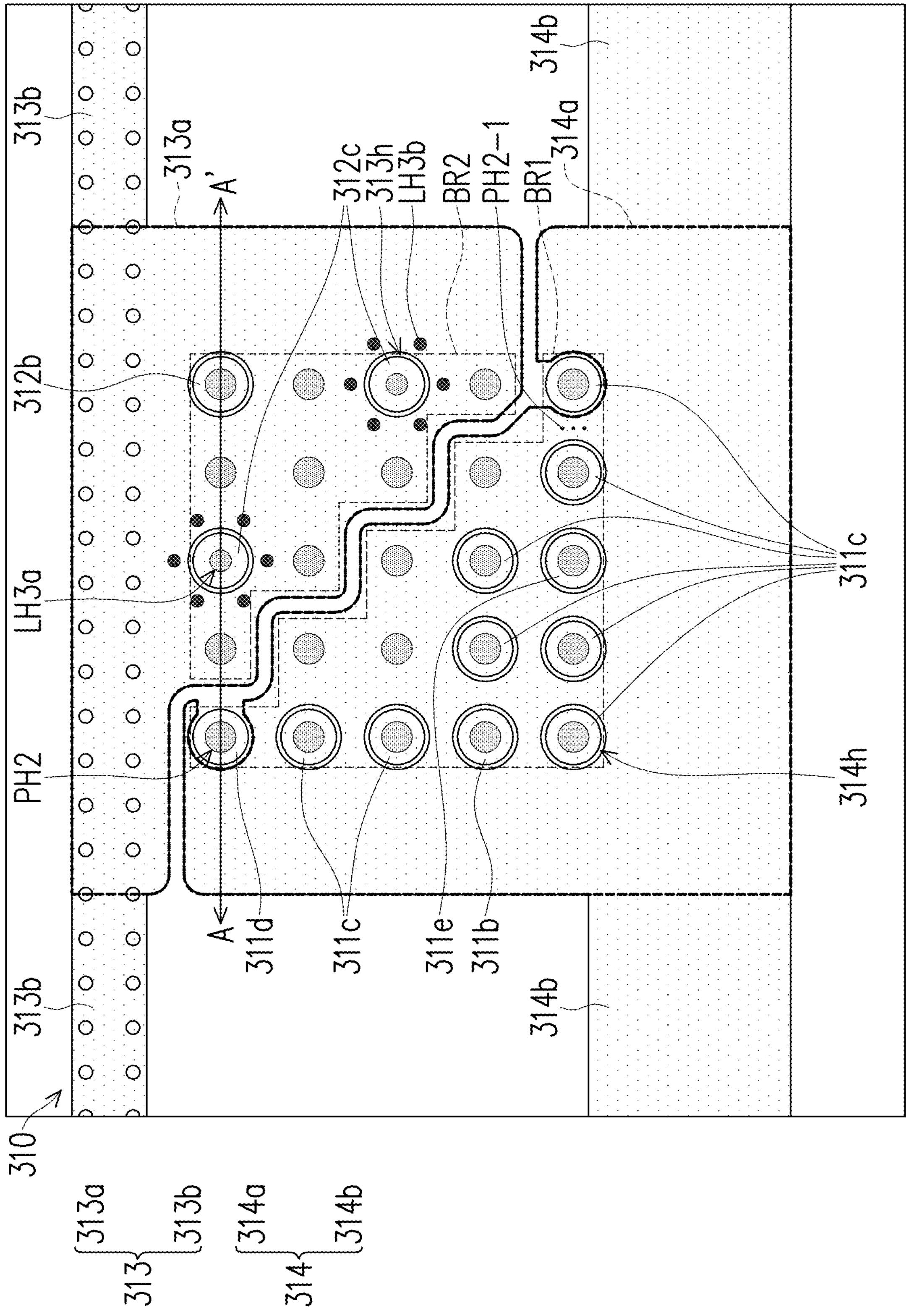
Figure 4F:
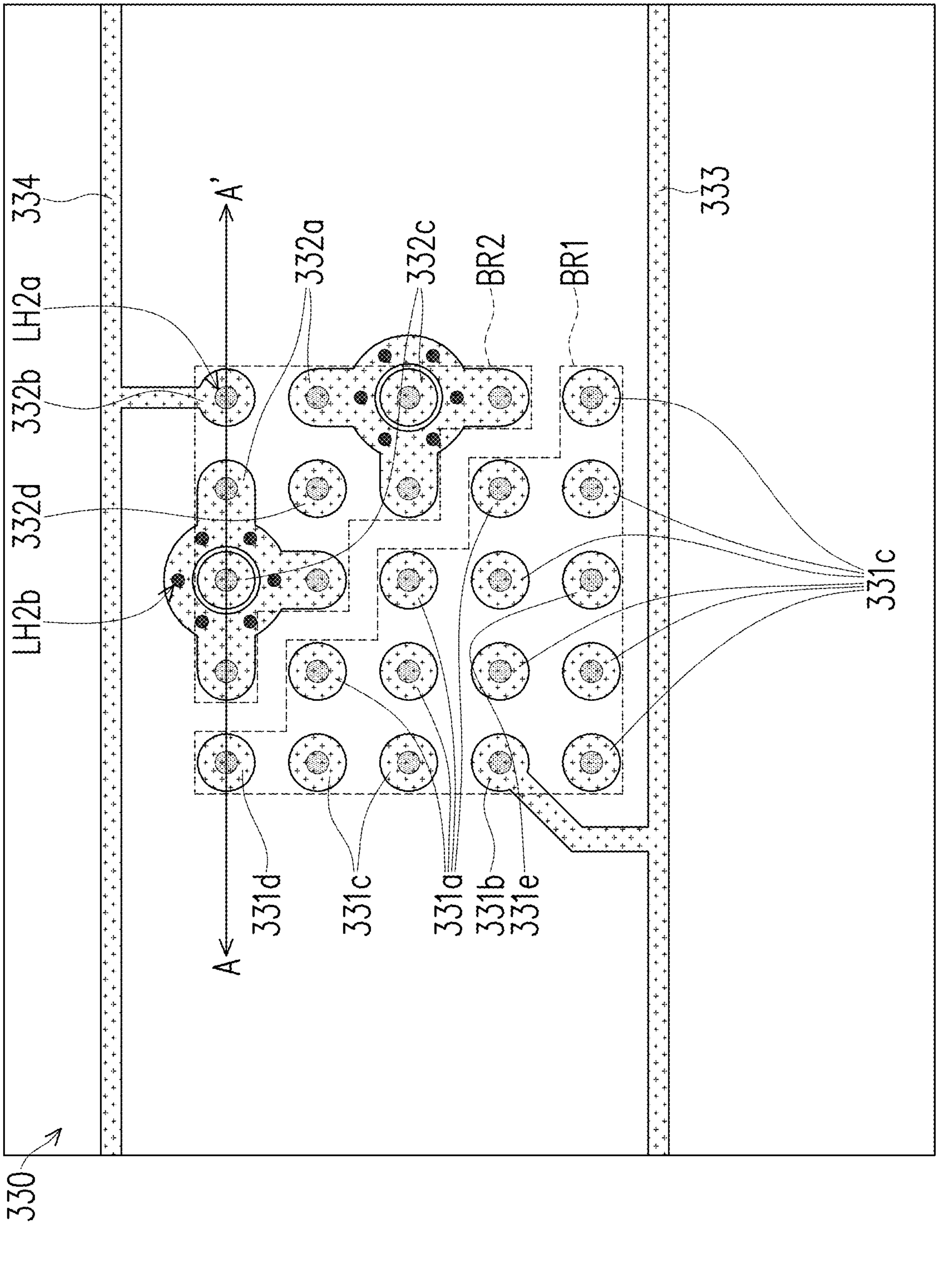

The first pad 331*b* overlaps with the corresponding opening 314*h* of the first ground structure 314, and is connected to the first transition structure 311*b* within the aforementioned opening 314*h* through the corresponding conductive via LH2*a*, thereby electrically connecting to the first conductive feature 231*b* through the first transition structure 311*b* (please refer to FIG. 4D). In some embodiments, the first transition structure 311*b* and the first conductive feature 231*b* may be omitted. The signal line 333 is connected to the first pad 331*b*. In some embodiments, the signal line 333 is configured to transmit a power signal AVDD.

Multiple first pads 331*c* are respectively overlapped with corresponding multiple openings 314*h* of the first ground structure 314, and are respectively connected to the first transition structures 311*c* within the aforementioned multiple openings 314*h* through corresponding multiple conductive vias LH2*a*. The multiple first pads 331*c* are respectively electrically connected to the first conductive features 231*c* (refer to FIG. 4D) through multiple first transition structures 311*c*, thereby respectively electrically connecting to the signal lines 211*a*, 211*b*, 212, 214, 215, 216, 217, and 218 (refer to FIG. 4C). In this embodiment, the first pad 331*c* is configured to transmit low-frequency signals required by controlling the chip 410 (including power signal (DVDD), radio frequency enable signal (RF_en), reference voltage signal (Vref), and circuit control signals (CS, CLK, SDI, SDO, PDI)). Among these, the first pad 331*c* utilized for transmitting power signal (DVDD) and reference voltage signal (Vref) may also be referred to as analog signal pad, while the first pad 331*c* utilized for transmitting radio frequency enable signal (RF_en) and circuit control signals (CS, CLK, SDI, SDO, PDI) may also be referred to as digital signal pad.

The first pad 331*d* overlaps with the corresponding opening 314*h* of the first ground structure 314, and is connected to the first transition structure 311*d* within the aforementioned opening 314*h* through the corresponding conductive via LH2*a*. The first pad 331*d* is electrically connected to the first conductive feature 231*d* through the first transition structure 311*d*. In some embodiments, the first pad 331*d* is utilized for transmitting bias regulation signals (Rbias), and the first pad 331*d* may also be referred to as an analog signal pad.

The digital signal pad and the analog signal pad are electrically connected to the multiple first transition structures 311*c* and 311*d* respectively.

The first pad 331*e* is connected to the corresponding first transition structure 311*e* or the first ground structure 314 through the corresponding conductive via LH2*a*, and is utilized to transmit the ground signal AGND/DGND.

The shielding layer 332*a* is connected to the second ground structure 313 through corresponding multiple conductive vias LH2*a*. In this embodiment, each shielding layer 332*a* is further electrically connected to the second ground structure 313 through multiple conductive vias LH2*b*, and subsequently electrically connected to the ground electrode 132 through the conductive via LH3*b* of the second ground structure 313 (please refer to FIG. 4B). In this embodiment, the shielding layer 332*a*, the ground electrode 132, and the second ground structure 313 are all configured to transmit ground signals (RF_GND). In alternative embodiments, the conductive via LH3*b* of the second ground structure 313 may be omitted, and the conductive vias LH2*b* of the shielding layer 332*a* may continuously penetrate through the insulating layer 320, the second dielectric layer 240, the first dielectric layer 220, and the buffer layer 310, and connect to the ground electrode 132.

The second pad 332*b* overlaps with the corresponding opening 313*h* of the second ground structure 313, and is connected to the second transition structure 312*b* within the aforementioned opening 313*h* through the corresponding conductive via LH2*a*. The second pad 332*b* is electrically connected to the second conductive feature 232*b* through the second transition structure 312*b* (please refer to FIG. 4D). In some embodiments, the second transition structure 312*b* and the second conductive feature 232*b* may be omitted. The second pad 332*b* is connected to the signal line 334. In some embodiments, the signal line 334 is configured to transmit RF signals and may be referred to as a radio frequency signal line. The second pad 332*b* may also be referred to as a RF signal pad. In some embodiments, the RF signal pad is disposed corresponding to the corners of the chip 410.

Multiple second pads 332*c* overlap with corresponding multiple openings 313*h* of the second ground structure 313, and are respectively connected to multiple second transition structures 312*c* within the multiple openings 313*h* through corresponding multiple conductive vias LH2*a*. The second pads 332*c* are electrically connected to multiple bonding structures 134 (refer to FIG. 4B) and the antenna electrode 110 (refer to FIG. 4A) through the second transition structure 312*c*. The second pad 332*c* is electrically connected to the chip 410 and the antenna electrode 110, and is utilized for transmitting the antenna signal (RF_out). The second pad 332*c* may also be referred to as antenna signal pad. The RF signal pad and the antenna signal pad are respectively electrically connected to the second transition structure 312*b* and the second transition structure 312*c*.

In some embodiments, in an orthographic projection, the distance between the center of the antenna signal pad (i.e., the second pad 332*c*) and the center of the antenna electrode 110 is approximately 800 micrometers. Furthermore, this configuration may reduce the risk of short-circuiting between the antenna signal pad (i.e., the second pad 332*c*) and other pads.

In alternative embodiments, the second transition structure 312*c* may be omitted, allowing the conductive via LH2*a* of the second pad 332*c* to continuously penetrate through the insulating layer 320, the second dielectric layer 240, the first dielectric layer 220, and the buffer layer 310, and connect to the bonding structure 134. This configuration may reduce impedance variation issues in signal transmission between different conductive layers.

The shielding layer 332*a* at least partially surrounds the second pad 332*c* to reduce interference from external signals to the antenna signal (RF_out).

In some embodiments, the conductive vias LH2*b* of the shielding layer 332*a* are arranged around the conductive vias LH2*a* of the second pad 332*c*, thereby further reducing interference from external signals to the antenna signal (RF_out).

The second pad 332*d* is connected to the second ground structure 313 through the corresponding conductive via LH2*a*. In some embodiments, the second pad 332*d* may be omitted, or the second pad 332*d* may be connected to the shielding layer 332*a*.

The chip 410 is bonded to the first pads 331*a*, 331*b*, 331*c*, 331*d*, the shielding layer 332*a*, and the second pads 332*b*, 332*c*, and 332*d*. In some embodiments, in an orthographic projection, the RF signal line (i.e., signal line 334) is disposed proximate to one side of the chip 410 (e.g., the upper side), whereas the signal lines 211*a*, 211*b*, 212, 213, 214, 215, 216, 217, and 218 are disposed proximate to the other side of the chip 410 (e.g., the lower side).

Figure 5A:
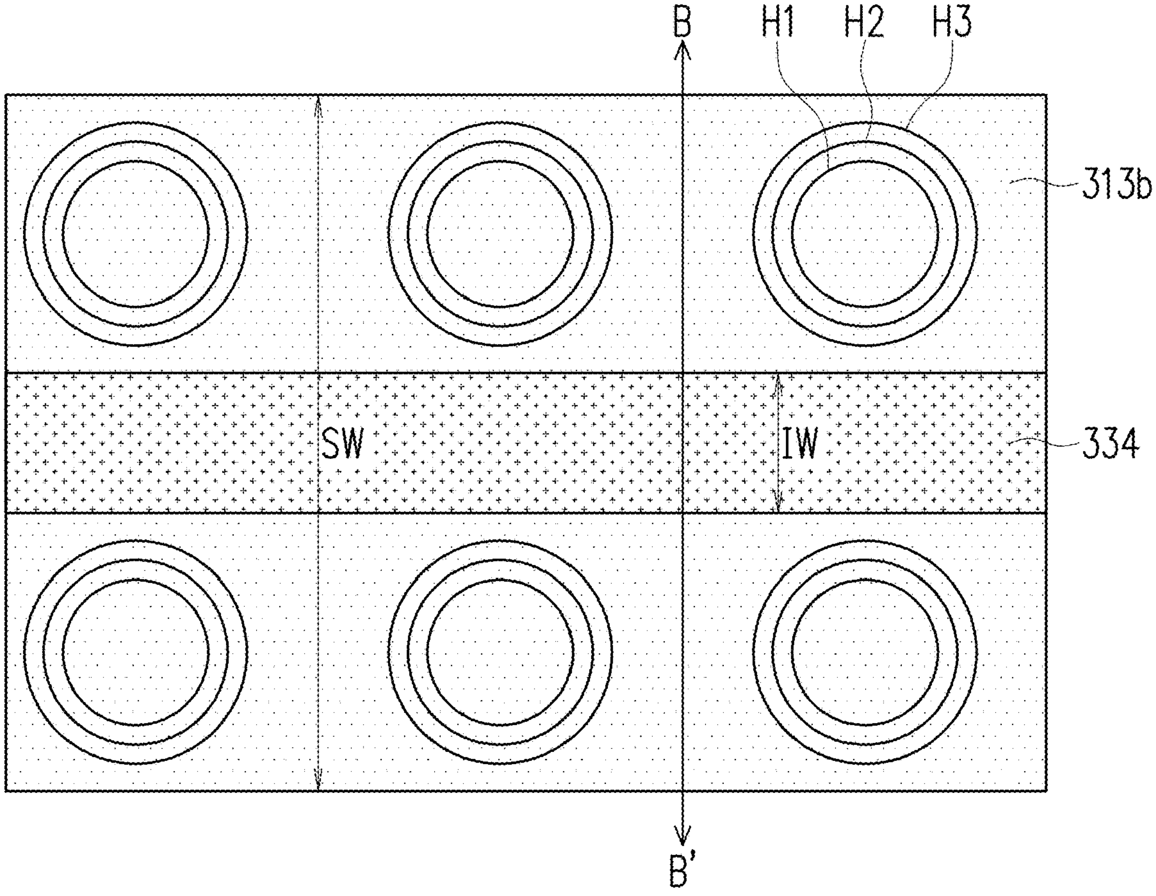
FIG. 5A is a partial enlarged view of the antenna device of FIG. 3.
Figure 5B:
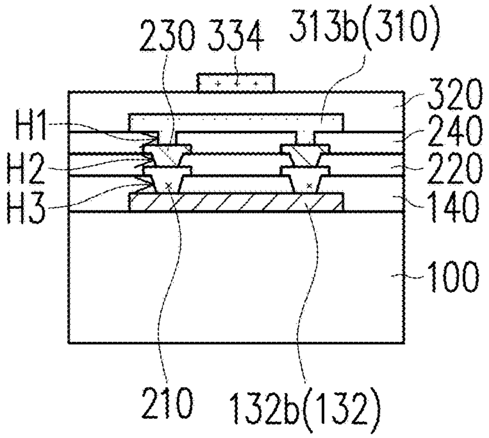
FIG. 5B is a schematic cross-sectional view taken along line B-B' in FIG. 5A.

FIG. 5A is a partial enlarged view of the antenna device 1B of FIG. 3. FIG. 5B is a schematic cross-sectional view taken along line B-B' in FIG. 5A. Please refer to FIG. 3, FIG. 5A, and FIG. 5B. The signal line 334 (RF signal line) is disposed on the insulating layer 320. The signal line 334 overlaps with the wire portion 313*b* of the second ground structure 313, and the width SW of the wire portion 313*b* of the second ground structure 313 is greater than the width IW of the signal line 334.

In this embodiment, the wire portion 313*b* is electrically connected to the second thin-film conductive layer 230 through multiple conductive vias H1 formed by laser processing. Multiple openings are formed in the first dielectric layer 220 and the second dielectric layer 240 utilizing photolithography and etching processes. Multiple contact portions H2 of the second thin-film conductive layer 230 are respectively filled into the multiple openings of the second dielectric layer 240 and contact the first thin-film conductive layer 210. Multiple contact portions H3 of the first thin-film conductive layer 210 are respectively filled into the multiple openings of the first dielectric layer 220 and contact the wire portion 132*b* of the ground electrode 132. In this embodiment, each conductive via H1 overlaps with a corresponding contact portion H2 and a corresponding contact portion H3. In some embodiments, the conductive vias H1, the contact portion H2, and the contact portion H3 have different widths. For example, the width of the contact portion H3 is greater than the width of the contact portion H2, and the width of the contact portion H2 is greater than the width of the conductive via H1.

Figure 6A:
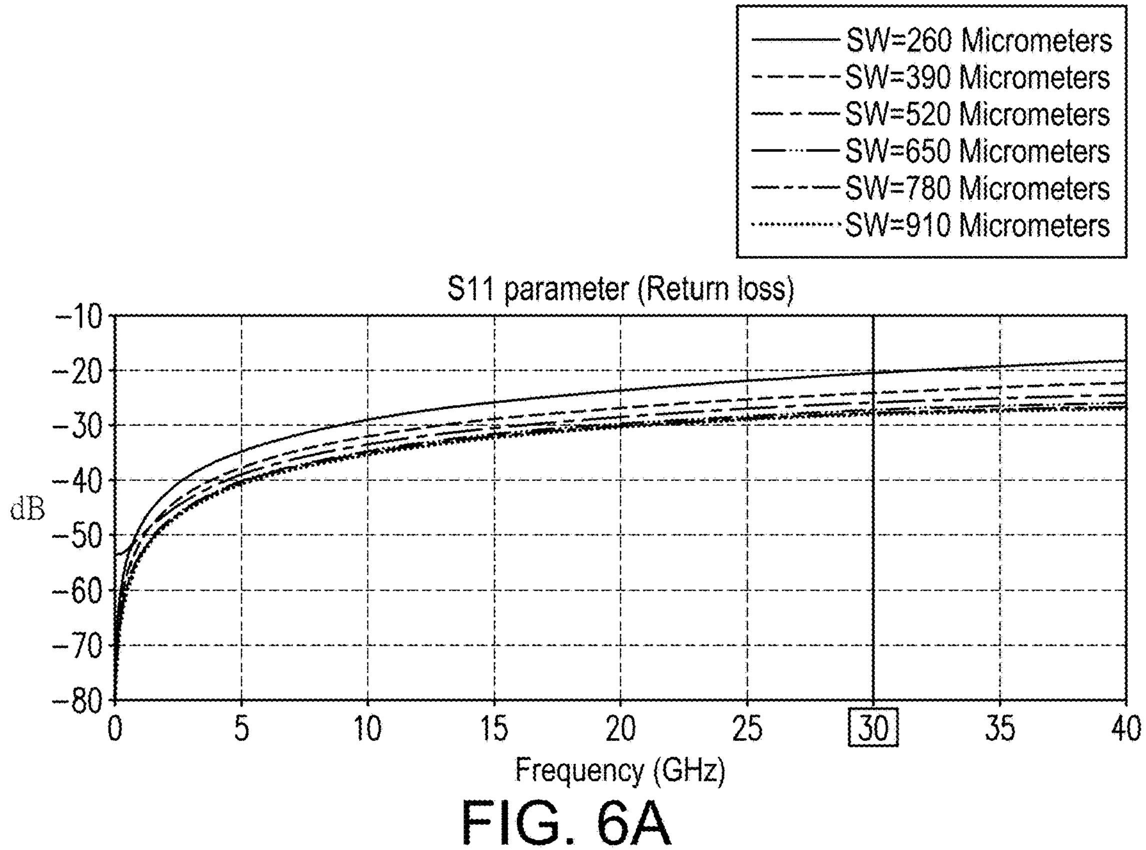
FIG. 6A is a simulation curve diagram of S11 parameter of some antenna devices according to an embodiment of the present disclosure.
Figure 6B:
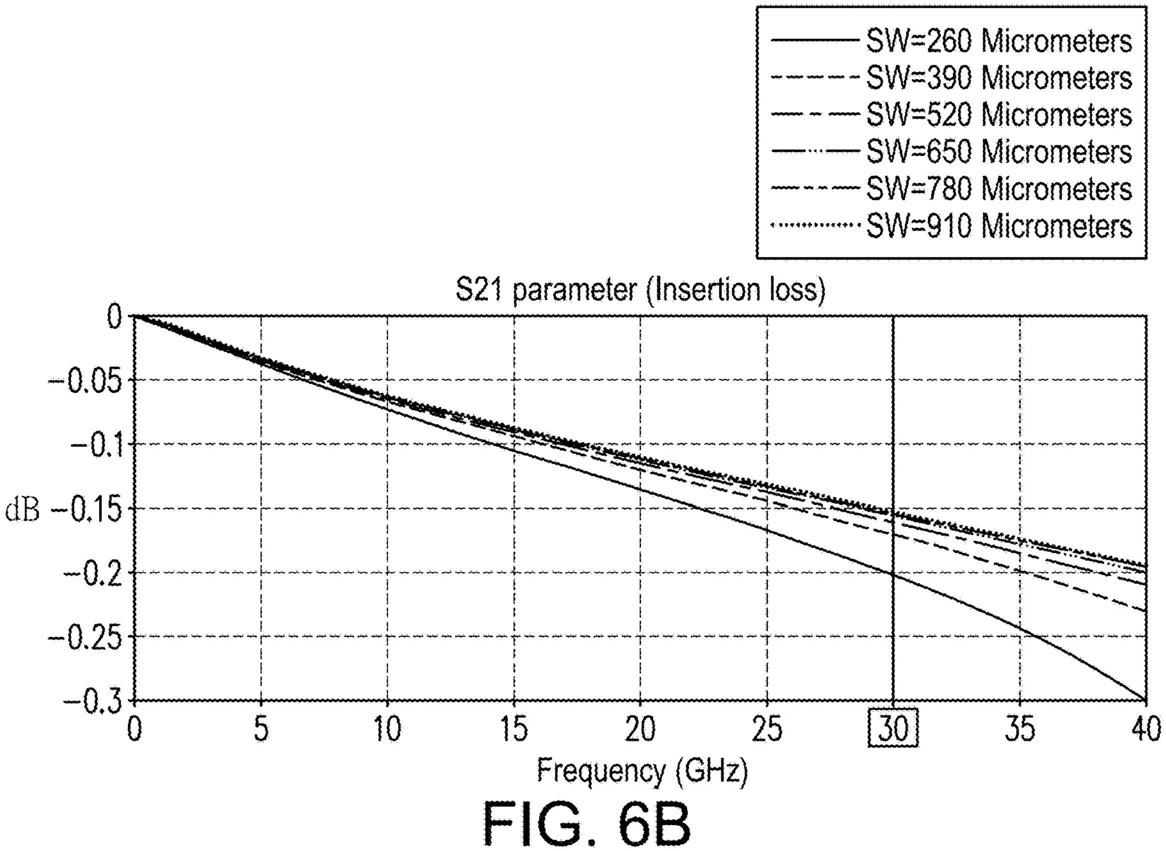
FIG. 6B is a simulation curve diagram of S21 parameter of some antenna devices according to an embodiment of the present disclosure.

FIG. 6A is a simulation curve diagram of S11 parameter of some antenna devices according to an embodiment of the present disclosure. FIG. 6B is a simulation curve diagram of S21 parameter of some antenna devices according to an embodiment of the present disclosure. In the antenna device employed in the simulation, the RF signal line (reference may be made to signal line 334 in FIG. 5A) has a width of 130 micrometers, a length of 1 millimeter, and a thickness of 10 micrometers. A wire portion of the second ground structure (reference may be made to wire portion 313*b* in FIG. 5A) is disposed 50 micrometers below the RF signal line. The width of the wire portion is adjusted while maintaining the width of the RF signal line at 130 micrometers. It is assumed that a dielectric material with a thickness of 50 micrometers and a relative dielectric constant εr of 2.5 is present between the RF signal line and the second ground structure, while the vacuum dielectric constant 20 is 1.

When the frequency of the signal is 30 GHz, the dB value of S11 and the dB value of S21 are shown in Table 2 respectively.

TABLE 2

| Width of wire portion | dB value of S11 | dB value of S21 |
|---|---|---|
| 260 micrometers | −20.637112 | −0.20318622 |
| 390 micrometers | −24.194646 | −0.17211097 |
| 520 micrometers | −26.087466 | −0.16263169 |
| 650 micrometers | −27.396037 | −0.15755175 |
| 780 micrometers | −27.966025 | −0.1557127 |
| 910 micrometers | −28.180495 | −0.15488827 |

As evidenced by Table 2, it can be ascertained that when the width SW of the wire portion 313*b* (as illustrated in FIG. 5A) is approximately three times or more than the width IW of the signal line 334, the signal loss gradually approaches saturation. Furthermore, when the width SW of the wire portion 313*b* (as illustrated in FIG. 5A) is approximately five times or more than the width IW of the signal line 334, the difference in insertion loss is merely about 2% or less.

Figure 7:
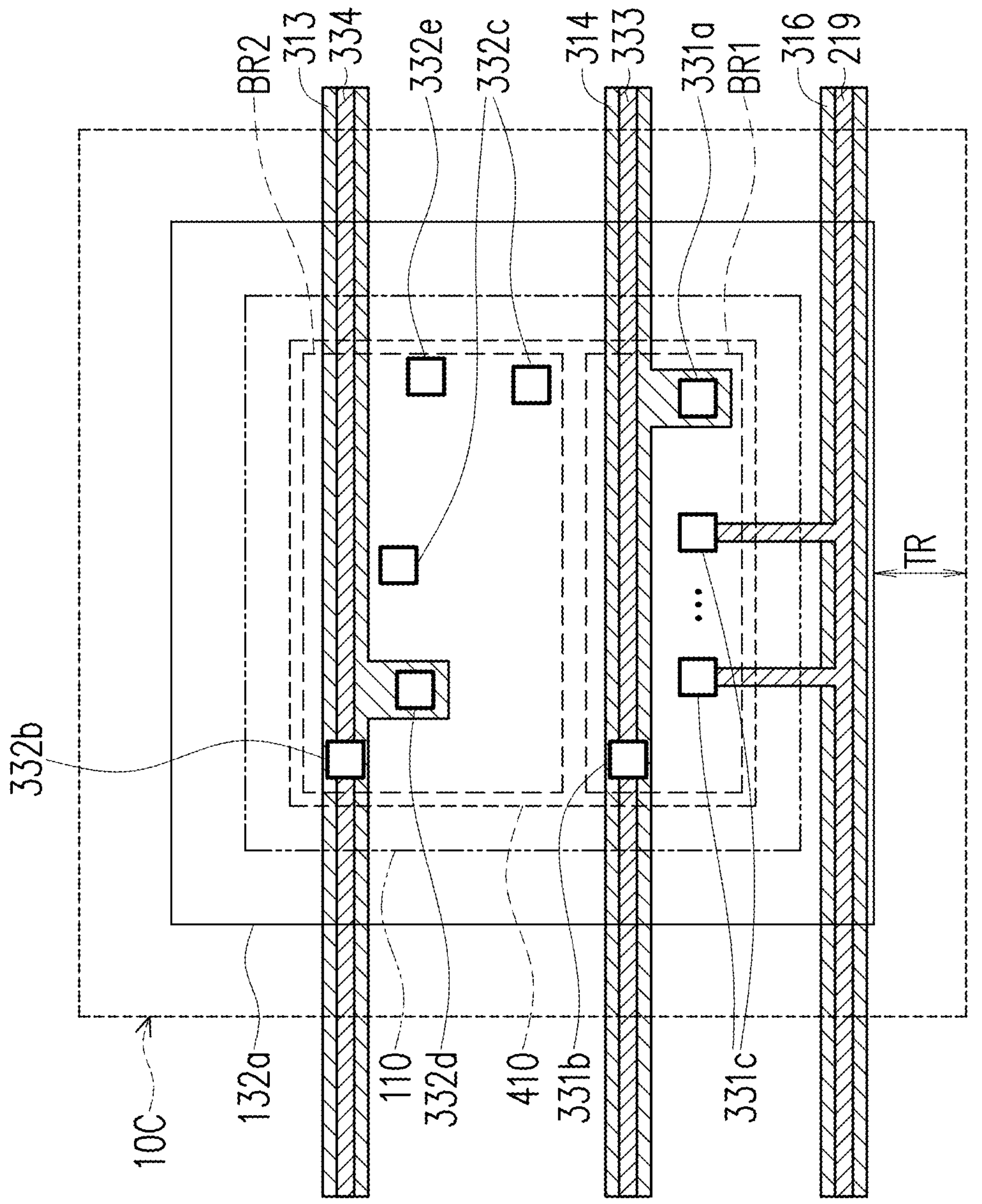
FIG. 7 is a schematic top view of an antenna unit according to another embodiment of the present disclosure.

FIG. 7 is a schematic top view of an antenna unit 10C according to another embodiment of the present disclosure. It should be noted that the embodiment in FIG. 7 adopts the component labels and partial content from the embodiment in FIG. 2, wherein identical or similar labels are used to represent identical or similar components, and explanations of identical technical content have been omitted. For details regarding the omitted portions, please refer to the aforementioned embodiment; they will not be reiterated herein.

Please refer to FIG. 7. In this embodiment, the thin-film circuit structure includes one or more digital signal lines 219. The digital signal line 219 is electrically connected to the chip 410 through one or more first pads 331*c* in the first bonding area BR1.

One or more signal lines 316 are utilized for transmitting ground signals (DGND) and/or power signals (DVDD). In the present embodiment, the signal line 316 does not extend beneath the chip 410; however, the present disclosure is not limited to this configuration.

The first ground structure 314 is utilized for transmitting the ground signal (AGND). The signal line 333 is employed for transmitting the power signal (AVDD). The first ground structure 314 is electrically connected to the chip 410 through the first pad 331*a* in the first bonding area BR1. The signal line 333 is electrically connected to the chip 410 through the first pad 331*b* in the first bonding area BR1.

The second ground structure 313 is utilized for transmitting the ground signal (RF_GND). The signal line 334 is employed for transmitting the RF signal. The second ground structure 313 is electrically connected to the chip 410 through the second pad 332*d* in the second bonding area BR2. The signal line 334 is electrically connected to the chip 410 through the second pad 332*b* in the second bonding area BR2. The second pad 332*c* in the second bonding area BR2 is electrically connected to the chip 410 and the antenna electrode 110, and is utilized for transmitting the antenna signal (RF_out). For instance, two second pads 332*c* are respectively utilized for transmitting the horizontally polarized electric field antenna signal (RF_out_H) and the vertically polarized electric field antenna signal (RF_out_V). The second pad 332*e* in the second bonding area BR2 is electrically connected to the chip 410 and the ground electrode 132.

Based on the foregoing, the first ground structure 314, the first pad 331*a*, and the first pad 331*b* are disposed within the first bonding area BR1, while the second ground structure 313, the second pad 332*b*, the second pad 332*c*, the second pad 332*d*, and the second pad 332*e* are disposed within the second bonding area BR2, thereby mitigating interference from other signals to high-frequency signals.

In other embodiments, the first bonding area BR1 and the second bonding area BR2 may also have other shapes.

Figure 8:
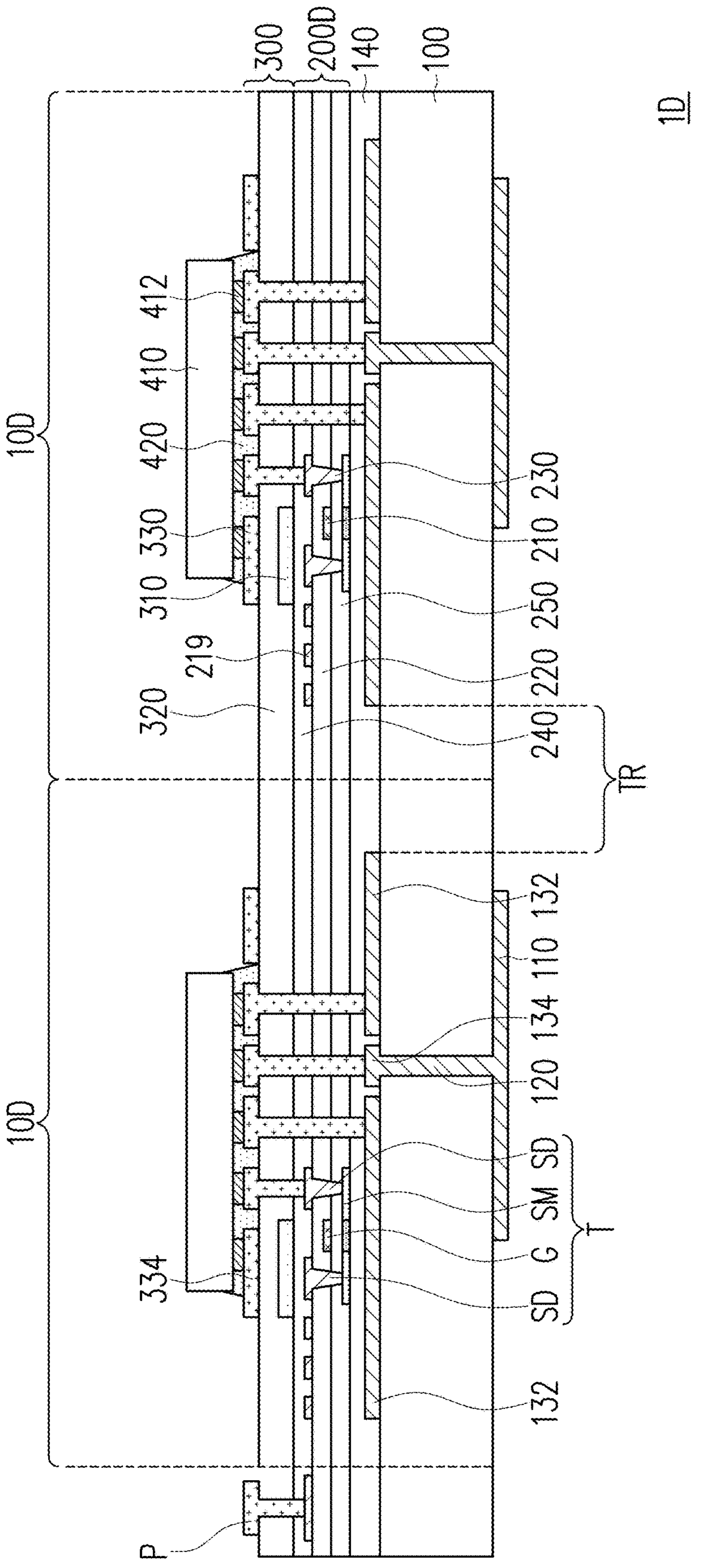
FIG. 8 is a schematic cross-sectional view of an antenna device according to an embodiment of the present disclosure.

FIG. 8 is a schematic cross-sectional view of an antenna device 1D according to an embodiment of the present disclosure. It should be noted that the embodiment in FIG. 7 adopts the component numbers and partial content from the embodiment in FIG. 2, wherein identical or similar numbers are used to represent identical or similar components, and explanations of identical technical content are omitted. For the omitted explanations, please refer to the aforementioned embodiments, which will not be reiterated here. Referring to FIG. 8, the antenna device 1D includes a transparent substrate 100 and multiple antenna units 10D disposed on the transparent substrate 100. The antenna units 10D are, for example, arranged in an array, and there are light-transmitting regions TR between the antenna units 10D.

Each antenna unit 10D includes an antenna electrode 110, a ground electrode 132, a thin-film circuit structure 200D, a redistribution structure 300, and a chip 410.

In this embodiment, each antenna unit 10D includes a thin-film transistor T disposed within the thin-film circuit structure 200D. For instance, in this embodiment, a gate dielectric layer 250 is additionally included between the first dielectric layer 220 and the buffer layer 140. Furthermore, multiple semiconductor layers SM are included between the gate dielectric layer 250 and the buffer layer 140.

The first thin-film conductive layer 210 is disposed on the gate dielectric layer 250 and includes a gate G overlapping with the semiconductor layer SM. The first dielectric layer 220 covers the gate G. The second thin-film conductive layer 230 is disposed on the first dielectric layer 220 and includes multiple sources/drains SD. In the present embodiment, each thin-film transistor T includes a corresponding semiconductor layer SM, a corresponding gate G, and corresponding source/drain SD. In this embodiment, the thin-film transistor T is a top-gate type thin-film transistor; however, the present disclosure is not limited thereto. In other embodiments, the thin-film transistor T is a bottom-gate type thin-film transistor, a dual-gate type thin-film transistor, or other types of thin-film transistors.

The thin-film transistor T is electrically connected to the chip 410 and the digital signal line 219 in the thin-film circuit structure 200D. The thickness of the digital signal line 219 is less than the thickness of the signal line 334 (RF signal line). The digital signal line 219 is utilized, for example, to transmit any of the digital signals described in the preceding embodiments.

In this embodiment, the redistribution structure 300 further includes a pad P. The pad P is utilized, for example, to connect an external flexible circuit board.

Figure 9:
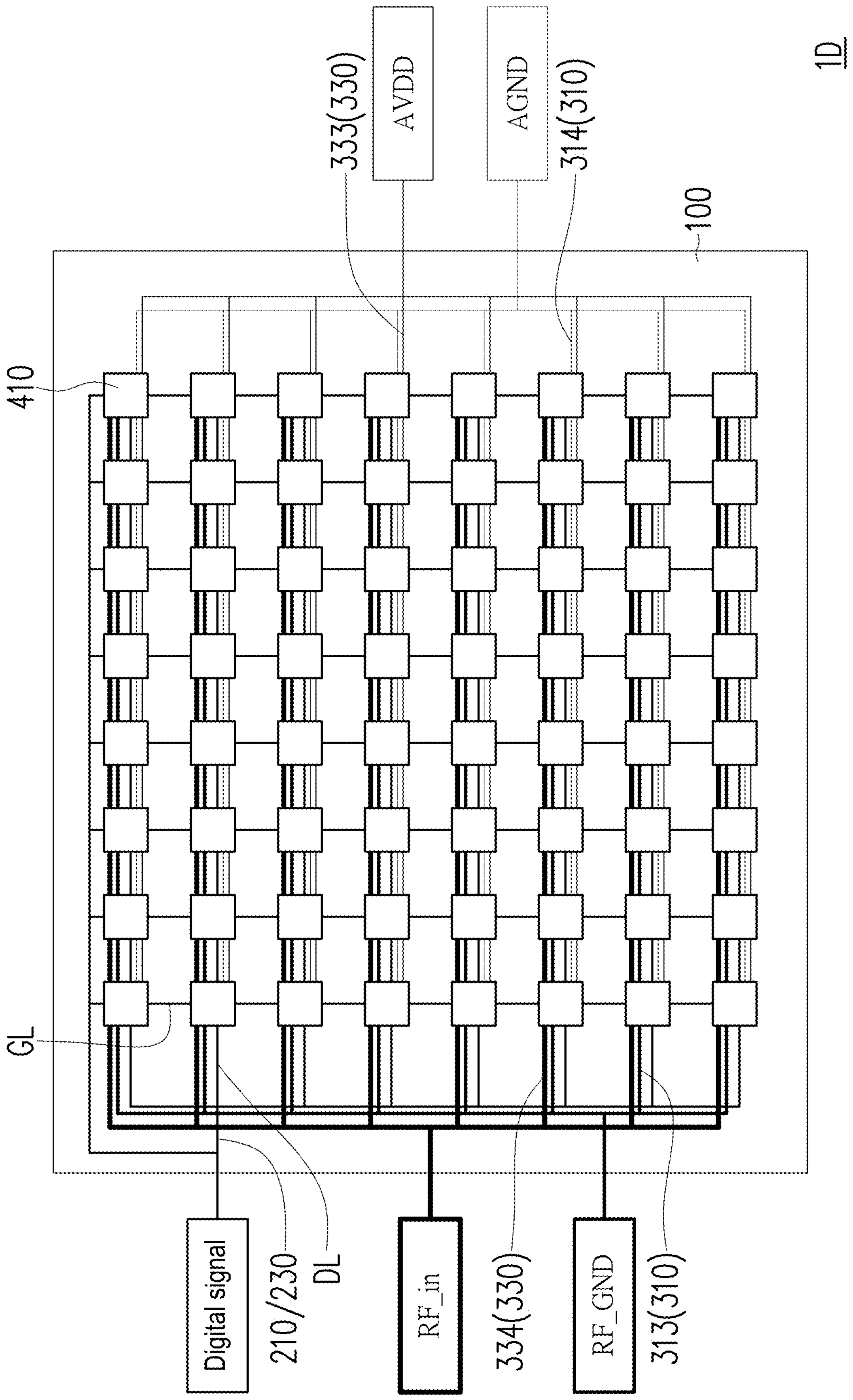
FIG. 9 is a schematic top view of an antenna device according to an embodiment of the present disclosure.

FIG. 9 is a schematic top view of an antenna device 1D according to an embodiment of the present disclosure. In this embodiment, the antenna device 1D includes multiple antenna units arrayed on a transparent substrate 100. FIG. 9 illustrates the chip 410 within the antenna unit, while omitting other structures of the antenna unit. It should be noted that in FIG. 9, a single line segment may represent either a single signal line or multiple signal lines in close proximity.

In the present embodiment, the first thin-film conductive layer 210 and/or the second thin-film conductive layer 230 includes one or more digital signal lines GL and DL, which are utilized for transmitting digital signals to each antenna unit. A portion of the digital signal lines DL extend horizontally across multiple antenna units. A portion of the digital signal lines GL extend vertically across multiple antenna units. In the present embodiment, the digital signal lines GL are, for example, employed to control the gate G of the thin-film transistor T within the antenna unit (please refer to FIG. 8).

The RF input signal (RF_in) is transmitted to multiple antenna units 10D through the signal line 334 in the second redistribution layer 330.

The ground signal (AGND) and the ground signal (RF_GND) are respectively transmitted to multiple antenna units through the first ground structure 314 and the second ground structure 313 in the first redistribution layer 310.

The power signal (AVDD) is transmitted to multiple antenna units through the signal line 333 of the second redistribution layer 330.

Figure 10:
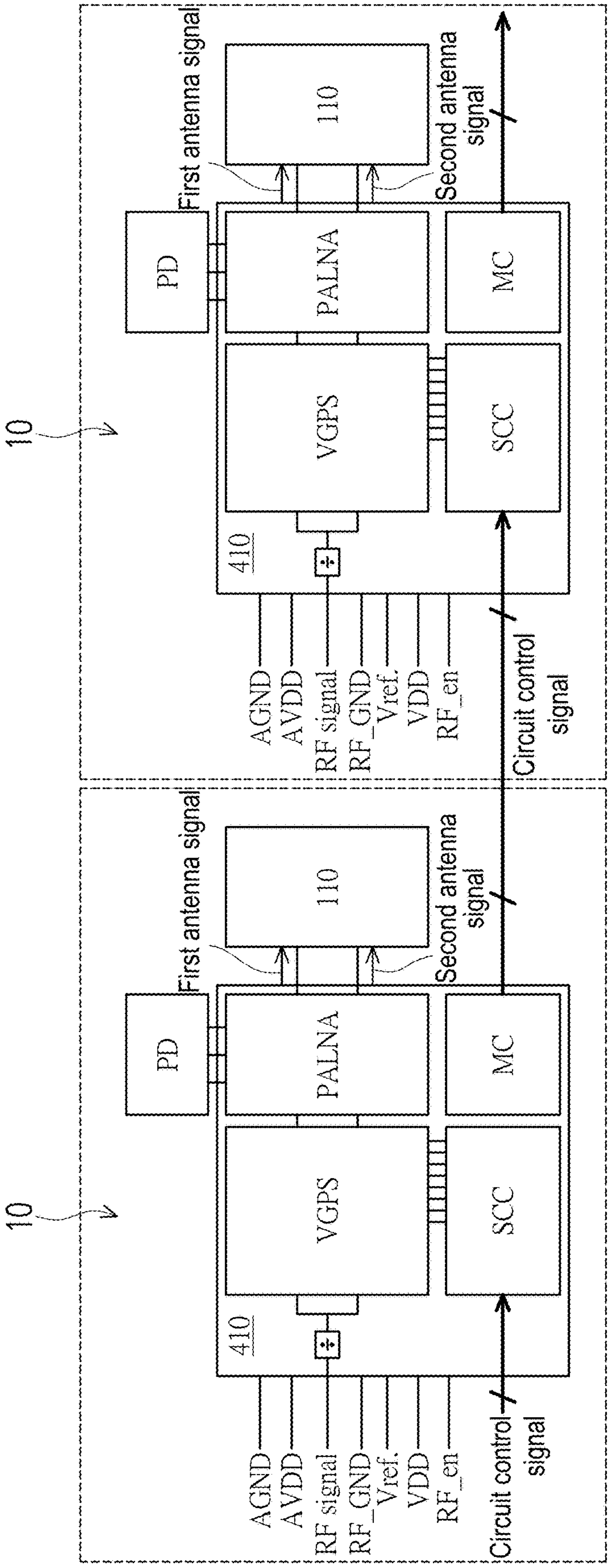
FIG. 10 is a functional block diagram of an antenna device according to an embodiment of the present disclosure.

FIG. 10 is a functional block diagram of an antenna device according to an embodiment of the present disclosure. In this embodiment, each antenna unit 10 includes a chip 410, and the chip 410 includes a BFIC.

In the present embodiment, ground signals (e.g., AGND, RF_GND, etc.), power signals (e.g., AVDD, DVDD, etc.), the RF signal, the RF enable signal (RF_en), the reference voltage signal (Vref), and various circuit control signals (e.g., CS, CLK, SDI, SDO, PDI, etc.) are connected to the chip 410.

In the present embodiment, the circuit control signal is provided to the signal control circuit module SCC and the memory circuit module MC within the chip 410. The signal control circuit module SCC provides signals to the variable gain amplifier and phase shifter module VGPS.

In the present embodiment, the RF signal, after being processed by the power divider, is provided to the variable gain amplifier and phase shifter module VGPS. The variable gain amplifier and phase shifter module VGPS subsequently supplies the signal to the power amplifier and/or low loss amplifier module PALNA.

The power amplifier and/or low loss amplifier module PALNA provides a first antenna signal (e.g., a horizontally polarized electric field antenna signal (RF_out_H)) and a second antenna signal (e.g., a vertically polarized electric field antenna signal (RF_out_V)) to the antenna electrode 110.

In some embodiments, additional passive components PD may be incorporated within the antenna unit 10, such as inductors, capacitors, and/or resistors. The passive components are connected to the power amplifier and/or the low loss amplifier module PALNA of the chip 410.

In view of the foregoing, the present disclosure mitigates interference with high-frequency signals by segregating the pads for high-frequency signals from those designated for low-frequency signals.

What is claimed is:

1. An antenna device, comprising:
- a transparent substrate;
- a plurality of antenna units disposed on the transparent substrate, wherein each of antenna units comprises:
  - an antenna electrode disposed on a first surface of the transparent substrate;
  - a ground electrode disposed on a second surface of the transparent substrate opposite to the first surface;
  - a thin-film circuit structure disposed on the ground electrode and comprising a digital signal line;
  - a redistribution structure disposed on the thin-film circuit structure and comprising:
    - a digital signal pad electrically connected to the digital signal line;
    - an analog signal line and an analog signal pad electrically connected to the analog signal line;
    - a radio frequency (RF) signal line and a radio frequency (RF) signal pad electrically connected to the RF signal line; and
    - an antenna signal pad electrically connected to the antenna electrode; and
  - a chip bonded to the digital signal pad, the analog signal pad, the RF signal pad, and the antenna signal pad, wherein the digital signal pad and the analog signal pad are disposed in a first bonding area, and the RF signal pad and the antenna signal pad are disposed in a second bonding area separated from the first bonding area.

2. The antenna device according to claim 1, wherein the redistribution structure comprises:
- a first ground structure and a second ground structure separated from each other;
- an insulating layer disposed on the first ground structure and the second ground structure; and
- a shielding layer disposed on the insulating layer and at least partially surrounding the antenna signal pad, wherein the shielding layer is electrically connected to the second ground structure.

3. The antenna device according to claim 2, further comprising a plurality of first transition structures, wherein the first ground structure and the plurality of first transition structures overlap with the first bonding area, and the second ground structure overlaps with the second bonding area, wherein at least a portion of the plurality of first transition structures are surrounded by the first ground structure, and wherein the antenna signal pad comprises a first conductive via passing through the insulating layer.

4. The antenna device according to claim 3, wherein the shielding layer comprises a plurality of second conductive vias penetrating through the insulating layer, wherein the plurality of second conductive vias are arranged around the first conductive via.

5. The antenna device according to claim 3, wherein the digital signal pad and the analog signal pad are electrically connected to the plurality of first transition structures respectively.

6. The antenna device according to claim 3, wherein the thin-film circuit structure comprises, in sequential deposition order, a first thin-film conductive layer, a dielectric layer, and a second thin-film conductive layer, wherein the second thin-film conductive layer is electrically connected to the first thin-film conductive layer through at least one contact portion located within the dielectric layer, and wherein an inclination angle of a sidewall of the contact portion differs from an inclination angle of a sidewall of the first conductive via.

7. The antenna device according to claim 1, wherein the redistribution structure comprises:
- a first ground structure and a second ground structure separated from each other, wherein the second ground structure comprises a block portion overlapping with the second bonding area and a wire portion extending outwardly from the block portion; and
- an insulating layer disposed on the first ground structure and the second ground structure, wherein the RF signal line is disposed on the insulating layer and overlaps with the wire portion of the second ground structure, and a width of the wire portion of the second ground structure is greater than a width of the RF signal line.

8. The antenna device according to claim 1, wherein the thin-film circuit structure comprises a thin-film transistor, wherein the thin-film transistor is electrically connected to the chip and the digital signal line, and wherein a thickness of the digital signal line is less than a thickness of the RF signal line.

9. An antenna device, comprising:
- a transparent substrate;
- a plurality of antenna units disposed on the transparent substrate, wherein each of antenna units comprises:
  - an antenna electrode disposed on a first surface of the transparent substrate;
  - a ground electrode disposed on a second surface of the transparent substrate opposite to the first surface;
  - a thin-film circuit structure disposed on the ground electrode;
  - a redistribution structure disposed on the thin-film circuit structure and comprising:
    - a first ground structure and a second ground structure separated from each other and overlapping with the ground electrode;
    - an insulating layer disposed on the first ground structure and the second ground structure; and
    - a first pad and a second pad disposed on the insulating layer, wherein the first pad overlaps with a first opening of the first ground structure, and the second pad overlaps with a second opening of the second ground structure, wherein the first ground structure and the first pad overlap with a first bonding area, and the second ground structure and the second pad overlap with a second bonding area that is separated from the first bonding area; and a chip overlapping with the first bonding area and the second bonding area, and bonded to the first pad and the second pad.

10. The antenna device according to claim 9, wherein the redistribution structure comprises:

a first transition structure disposed in the first opening, wherein the first pad is electrically connected to the first transition structure; and a shielding layer disposed on the insulating layer and at least partially surrounding the second pad, wherein the second pad has a first conductive via passing through the insulating layer, wherein the shielding layer has a plurality of second conductive vias passing through the insulating layer, wherein the plurality of second conductive vias are arranged around the first conductive via.

11. The antenna device according to claim 9, wherein the second ground structure comprises a block portion overlapping with the second bonding area and a wire portion extending outwardly from the block portion, wherein the redistribution structure further comprises:

a RF signal line disposed on the insulating layer, wherein the RF signal line overlaps with the wire portion of the second ground structure, and a width of the wire portion of the second ground structure is greater than a width of the RF signal line.

* * * * *